(12) United States Patent
Semenov

(10) Patent No.: US 11,816,165 B2
(45) Date of Patent: Nov. 14, 2023

(54) IDENTIFICATION OF FIELDS IN DOCUMENTS WITH NEURAL NETWORKS WITHOUT TEMPLATES

(71) Applicant: ABBYY Development Inc., Dover, DE (US)

(72) Inventor: Stanislav Semenov, Moscow (RU)

(73) Assignee: ABBYY Development Inc., Dover, DE (US)

( * ) Notice: Subject to any disclaimer, the term of this patent is extended or adjusted under 35 U.S.C. 154(b) by 594 days.

(21) Appl. No.: 16/692,169

(22) Filed: Nov. 22, 2019

(65) Prior Publication Data

US 2021/0150338 A1 May 20, 2021

(30) Foreign Application Priority Data

Nov. 20, 2019 (RU) .............................. RU2019137304

(51) Int. Cl.
 *G06F 16/93* (2019.01)
 *G06F 9/30* (2018.01)
 (Continued)

(52) U.S. Cl.
 CPC .......... *G06F 16/93* (2019.01); *G06F 9/30036* (2013.01); *G06F 16/335* (2019.01);
 (Continued)

(58) Field of Classification Search
 CPC ...... G06N 3/08; G06N 3/0445; G06N 3/0454; G06N 3/0472; G06N 3/084; G06N 20/10;
 (Continued)

(56) References Cited

U.S. PATENT DOCUMENTS 5,819,247 A * 10/1998 Freund ............. G06V 30/19147
706/26
5,937,084 A * 8/1999 Crabtree .............. G07D 7/2016
382/137

(Continued)

FOREIGN PATENT DOCUMENTS

RU 2254610 C2 6/2006
WO 2018142266 A1 8/2018

OTHER PUBLICATIONS

Belaid, Abdel, et al., "Administrative Document Analysis and Structure", Learning Structure and Schemas from Documents, 375, Springer Verlag, Studies in Computation Intelligence, 978-3-642-22912.1, Mar. 2011, 22 pages.

(Continued)

*Primary Examiner* — Edwin S Leland, III
(74) *Attorney, Agent, or Firm* — Lowenstein Sandler LLP

(57) ABSTRACT

Aspects of the disclosure provide for mechanisms for identification of fields in documents using neural networks. A method of the disclosure includes obtaining a layout of a document, the document having a plurality of fields, identifying the document, based on the layout, as belonging to a first type of documents of a plurality of identified types of documents, identifying a plurality of symbol sequences of the document, and processing, by a processing device, the plurality of symbol sequences of the document using a first neural network associated with the first type of documents to determine an association of a first field of the plurality of fields with a first symbol sequence of the plurality of symbol sequences of the document.

20 Claims, 16 Drawing Sheets

(51) Int. Cl.
  *G06N 3/08* (2023.01)
  *G06V 30/224* (2022.01)
  *G06F 16/335* (2019.01)
  *G06F 40/279* (2020.01)
  *G06V 10/762* (2022.01)
  *G06V 10/764* (2022.01)
  *G06V 10/82* (2022.01)
  *G06V 30/412* (2022.01)
  *G06F 18/23* (2023.01)
  *G06F 18/24* (2023.01)
  *G06F 18/232* (2023.01)
  *G06F 18/2413* (2023.01)
  *G06V 30/10* (2022.01)

(52) U.S. Cl.
  CPC ............ *G06F 18/23* (2023.01); *G06F 18/232* (2023.01); *G06F 18/2413* (2023.01); *G06F 18/24765* (2023.01); *G06F 40/279* (2020.01); *G06N 3/08* (2013.01); *G06V 10/763* (2022.01); *G06V 10/764* (2022.01); *G06V 10/765* (2022.01); *G06V 10/82* (2022.01); *G06V 30/224* (2022.01); *G06V 30/412* (2022.01); *G06V 30/10* (2022.01)

(58) Field of Classification Search
  CPC .......... G06N 3/02; G06N 3/045; G06N 3/044; G06N 3/047; G06F 9/30036; G06F 16/335; G06F 16/93; G06F 40/279; G06F 40/216; G06F 40/284; G06F 40/30; G06F 18/23; G06F 18/232; G06F 18/2413; G06F 18/24765; G06K 9/6218; G06K 9/622; G06K 9/626; G06K 9/627; G06V 30/224; G06V 30/10; G06V 10/82; G06V 30/412; G06V 30/194; G06V 10/763; G06V 10/764; G06V 10/765
  USPC .............................................................. 704/9
  See application file for complete search history.

(56) References Cited

U.S. PATENT DOCUMENTS

| | | | | |
|---|---|---|---|---|
| 6,134,344 A * | 10/2000 | Burges | ................ | G06F 18/2411 382/253 |
| 6,567,797 B1 * | 5/2003 | Schuetze | ................ | G06F 16/30 707/999.005 |
| 6,922,699 B2 * | 7/2005 | Schuetze | ............ | G06F 16/5838 707/E17.022 |
| 6,990,238 B1 * | 1/2006 | Saffer | ................ | G06F 16/34 707/E17.093 |
| 8,261,186 B2 * | 9/2012 | Mansfield | ............ | G06F 40/186 715/272 |
| 8,276,067 B2 * | 9/2012 | Rujan | ................ | G06F 16/355 715/273 |
| 8,897,563 B1 * | 11/2014 | Welling | ................ | G06V 30/182 382/176 |
| 8,996,350 B1 * | 3/2015 | Dub | ................ | G06F 16/24578 707/673 |
| 10,769,056 B2 * | 9/2020 | Maliani | ............ | G06F 11/3684 |
| 10,824,854 B2 * | 11/2020 | Aguiar | ............ | G06V 30/19173 |
| 10,963,692 B1 * | 3/2021 | Corcoran | ............ | G06V 30/414 |
| 11,030,394 B1 * | 6/2021 | Kozareva | ................ | G06F 40/30 |
| 2003/0216919 A1 * | 11/2003 | Roushar | ................ | G06F 40/284 704/260 |
| 2010/0174982 A1 * | 7/2010 | Mansfield | ............ | G06F 40/126 715/273 |
| 2013/0086460 A1 * | 4/2013 | Folting | ................ | G06N 5/02 715/212 |
| 2013/0246322 A1 * | 9/2013 | De Sousa Webber | ................ | G06N 3/088 706/18 |
| 2014/0153830 A1 * | 6/2014 | Amtrup | ................ | G06V 30/416 382/190 |
| 2015/0324338 A1 * | 11/2015 | Levy | ................ | G06F 40/103 715/244 |
| 2015/0324640 A1 * | 11/2015 | Macciola | ................ | G06V 20/62 382/112 |
| 2016/0371543 A1 * | 12/2016 | Smirnov | ............ | G06V 30/413 |
| 2017/0236034 A1 * | 8/2017 | Dolev | ................ | G06V 20/63 705/44 |
| 2018/0196873 A1 * | 7/2018 | Yerebakan | ............ | G06N 3/08 |
| 2019/0294641 A1 * | 9/2019 | Alexeev | ................ | G06F 16/9577 |
| 2019/0384972 A1 * | 12/2019 | Aguiar | ................ | G06N 5/01 |
| 2020/0073882 A1 * | 3/2020 | Guggilla | ................ | G06N 3/044 |
| 2020/0097714 A1 * | 3/2020 | Moghtadai | ........ | G06Q 30/0206 |
| 2020/0151591 A1 * | 5/2020 | Li | ............ | G06N 3/08 |
| 2020/0160231 A1 * | 5/2020 | Asthana | ............ | G06F 16/9024 |
| 2020/0175304 A1 * | 6/2020 | Vig | ................ | G06F 16/24522 |
| 2020/0176098 A1 * | 6/2020 | Lucas | ................ | G16H 10/60 |
| 2021/0150338 A1 * | 5/2021 | Semenov | ............ | G06N 20/10 |
| 2021/0365836 A1 * | 11/2021 | Wilkins | ................ | G06T 3/0093 |
| 2023/0161948 A1 * | 5/2023 | Tsuzuku | ................ | G06V 30/416 704/9 |

OTHER PUBLICATIONS

Holt, Xavier, and Chisholm, Andrew, "Extracting Structured Data from Invoices", In Proceedings of Australasian Lanuage Technology Association Workshopm 2018, pp. 53-59.

Russian Office Action for Russian Application No. 2019137304/28(073723), dated Jul. 14, 2020, 6 pages.

* cited by examiner

FIG. 1B

IDENTIFICATION OF FIELDS IN DOCUMENTS WITH NEURAL NETWORKS WITHOUT TEMPLATES

RELATED APPLICATIONS

This application claims priority under 35 USC 119 to Russian patent application No. RU2019137304, filed Nov. 20, 2019.

TECHNICAL FIELD

The implementations of the disclosure relate generally to computer systems and, more specifically, to systems and methods for detecting fields in unstructured electronic documents using neural networks.

BACKGROUND

Detecting text fields in an unstructured electronic document is a foundational task in processing, storing, and referencing documents. Conventional approaches for field detection may involve the use of a large number of manually configurable heuristics and may thus require many human operations.

SUMMARY OF THE DISCLOSURE

Implementations of the present disclosure describe mechanisms for detecting text fields in unstructured electronic documents using neural networks. A method of the disclosure includes: obtaining a layout of a document, the document having a plurality of fields, identifying the document, based on the layout, as belonging to a first type of documents of a plurality of identified types of documents, identifying a plurality of symbol sequences of the document, and processing, by a processing device, the plurality of symbol sequences of the document using a first neural network associated with the first type of documents to determine an association of a first field of the plurality of fields with a first symbol sequence of the plurality of symbol sequences of the document.

A non-transitory machine-readable storage medium of the disclosure includes instructions that, when accessed by a processing device, cause the processing device to: obtain a layout of a document, the document having a plurality of fields, identify the document, based on the layout, as belonging to a first type of documents of a plurality of identified types of documents, identify a plurality of symbol sequences of the document, and process the plurality of symbol sequences of the document using a first neural network associated with the first type of documents to determine an association of a first field of the plurality of fields with a first symbol sequence of the plurality of symbol sequences of the document.

A system of the disclosure includes a memory, and a processing device operatively coupled to the memory, the processing device to: obtain a layout of a document, the document having a plurality of fields, identify the document, based on the layout, as belonging to a first type of documents of a plurality of identified types of documents, identify a plurality of symbol sequences of the document, and process, by a processing device, the plurality of symbol sequences of the document using a first neural network associated with the first type of documents to determine an association of a first field of the plurality of fields with a first symbol sequence of the plurality of symbol sequences of the document.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 1B is an exemplary illustration of a document that may be used to train one or more of the neural networks that may operate in accordance with some implementations of the present disclosure.

DETAILED DESCRIPTION

Figure 1A:
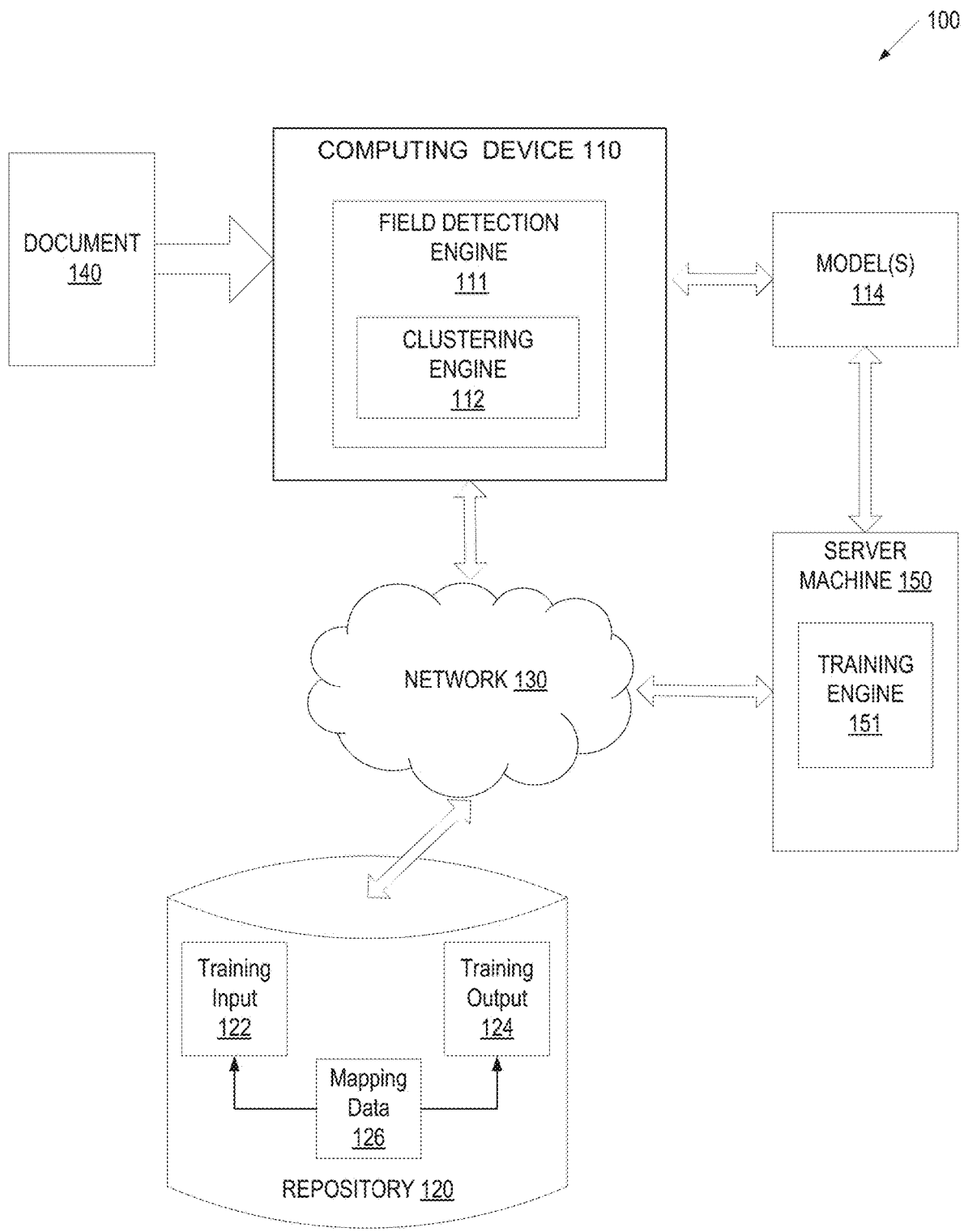
FIG. 1A is a block diagram of an example computer system in which implementations of the disclosure may operate.

Implementations for detecting fields and tables in unstructured electronic documents using neural networks are described. One conventional approach for identifying fields and corresponding field types in such documents is based on heuristics. In the heuristic approach, a large number (e.g., hundreds) of documents, such as restaurant checks or receipts, for example, are taken and statistics are accumulated regarding what text (e.g., keywords) can be used next to a particular field and where this text can be placed relative to the field (e.g., within the field, to the right, left, above, below it). For example, the heuristic approach can track what word or words are frequently located within or next to the field indicating the total purchase amount, what word or words are within or next to the field indicating applicable taxes, what word or words are within or next to the field indicating the total payment on a credit card, etc. Based on these statistics, when processing a new check, it can be determined which data detected on the document corresponds to a particular field. The heuristic approach does not always work precisely, however, because if for some reason a check has been recognized with errors, namely in the word combinations "Total Tax" and "Total Paid" the words "tax" and "paid" were poorly recognized, the corresponding values might be miscategorized.

Another conventional approach uses flexible field descriptors. Flexible descriptors may include a large number of various templates indicating where a particular field can be expected to be found within the document. For example, some templates may indicate that the field "Total" may be located directly to the right or directly below the words "Total" or "Total Paid," and so on. Performance of flexible field descriptors often deteriorates in those instances where a document has a specific field (e.g., the total dollar amount may be present on the invoice) but lacks an explicit descriptor of that field (e.g., the descriptor "Total" may be absent).

Because of a significant variability of locations of multiple fields in documents of even the same vendor, a large number of templates (sometimes, thousands) may have to be generated if a client (e.g., a bank or a dealer in goods and/or services) has many customers or business partners with each using their own document formats and layouts. As new vendors and types of documents are added to the client's database, the number of templates may have to be increased accordingly. A developer providing document recognition to the client may have to review samples of additional types of documents and generate additional templates with specific flexible field descriptors for each of the new types of documents. Such approach has a number of disadvantages. On one hand, new documents may contain confidential information that the client cannot share with the developer. On the other hand, such approach lacks flexibility—it may require significant efforts on the part of the developer to produce multiple client-specific models of field detection. For example, one client may be less interested in detecting fields related to "Tax collected" and focus instead on pre-tax totals whereas another client may be required to collect all available tax information. Some clients may be restricted from shipping particular goods to specific countries (or zip codes) and, therefore, may need to identify the address fields on purchasing orders before processing the orders.

Aspects of the disclosure address the above noted and other deficiencies by providing mechanisms for identification of fields in documents (e.g., unstructured electronic documents) using neural networks. The mechanisms described may analyze the layout of the document and, based on the layout, classify the document as belonging to a particular type (cluster) of documents and direct the document for field detection by one of the cluster-specific neural networks. The neural network model may be trained on documents of the respective type. The training of each neural network may require a limited number of documents and may be performed on the client side (as opposed to the developer side). As a result, the developer need not gain access to a confidential information of the client. Moreover, the client may limit its field detection to only those fields that are of actual interest to the client and to only those types of documents that the client actually encounters.

The implementations disclosed herein allow to train a machine learning model, specific for a particular document type, using only a few marked-up documents. In some instances, a single marked-up document may be sufficient to train the machine learning model. This represents a significant advance compared to the existing state of the document recognition technology. Because a limited number of training documents often suffices, this provides an additional benefit that the training may fully occur on the client side.

As used herein, "unstructured electronic document" (also referred to simply as "document" herein) may refer to any document whose image may be accessible to a computing system that performs identification of fields. The image may be a scanned image, a photographed image, or any other representation of a document that is being capable of being converted into a data form accessible to a computer. For example, "unstructured electronic document" may refer to a file comprising one or more digital content items that may be visually rendered to provide a visual representation of the electronic document (e.g., on a display or a printed material). In accordance with various implementations of the present disclosure, a document may conform to any suitable electronic file format, such as PDF, DOC, ODT, JPEG, etc. Although the document may be represented in an electronic (e.g., digital) file format, it is presumed that the document is not electronically structured and that the document layout— locations of various text fields, tables, paragraphs, etc.—is not specified in the electronic file. (As, for example, would be the case if the document were originally issued in an electronic format—an e-invoice or other similar electronic documents—with the locations of the fields and tables already specified.)

"Document" may represent a financial document, a legal document, or any other document, e.g., a document that is produced by populating fields with alphanumeric symbols (e.g., letters, words, numerals) or images. "Document" may represent a document that is printed, typed, or handwritten (for example, by filling out a standard form). "Document" may represent a form document that has a variety of fields, such as text fields (containing numerals, numbers, letters, words, sentences), graphics field (containing a logo or any other image), tables (having rows, columns, cells), and so on. As used herein, "field" may refer to a data field in document that contains alphanumeric characters or an element of a table (a row, a column, a cell), where "table" may refer to any graphical structure, e.g. a structure formed by lines. A table may include cells containing other fields, such as any fields populated with alphanumeric characters, and/or fields that contain images (such as logos), etc.

Some non-limiting examples of documents for field identification may include documents that have a standard content (which may be mandated by regulations or established business practices) but flexible distribution of this content within the document—mortgage/credit applications, real-estate purchase contracts, loan estimates, insurance contracts, police reports, purchasing orders, invoices, and so on. Documents may have fields that are encountered once or repeated multiple times within the same form (such as document number, date, total, etc.) or fields that may have multiple values (such as multiple order numbers, dates, shipping addresses, types of merchandize to be shipped, etc.).

As used herein, "field type" may refer to a type of content included in a field. For example, a text field type may be "name," "company name," "telephone," "fax," "address," "vendor name," "type of payment," "method of payment," "type of merchandize," "quantity of merchandize," or any other entry that may be present in a document. An image field may include a company logo, a signature, an image of a merchandize used in place of (or in addition to) a description of the merchandize, or any other image that may be included in a document.

The techniques described herein allow for automatic detection of fields in documents using artificial intelligence. The techniques may involve training a neural network to detect fields in documents and may classify fields into predefined classes. Each of the predefined classes may correspond to a field type. The neural network may include multiple neurons that are associated with learnable weights and biases. The neurons may be arranged in layers. The neural network may be trained on a training dataset of documents that contain known fields and/or tables. For example, the training data set may include examples of documents containing one or more fields as training inputs and one or more field type identifiers that correctly correspond to the one or more fields/tables as training outputs. A training input may be a document that is marked-up (e.g., by a client), for example by identifying a symbol sequence within the document (e.g. "11/26/2018") and a corresponding field (e.g., "date") to which the symbol sequence belongs. (The symbol sequence may be said to represent the value of the field in the document.)

The neural network may generate an observed output for each training input. The observed output of the neural network may be compared with a training output corresponding to the target input as specified by the training data set, and the error may be propagated back to the previous layers of the neural network, whose parameters (e.g., the weights and biases of the neurons) may be adjusted accordingly. During training of the neural network, the parameters of the neural network may be adjusted to optimize prediction accuracy.

Once trained, the neural network may be used for automatic detection of fields in an input document and selection of the most probable field type of each of the detected fields. The use of neural networks may prevent the need for manual markup of fields in documents during the identification phase. The mechanisms described herein to detect fields in a document may improve the quality of detection results by performing field detection using a trained neural network in a way that takes into account a context of the entire document. For example, neural networks set and trained in accordance with implementations of this disclosure may be capable of improved accuracy of field detection and classification of field types based on what kinds of alphanumeric sequences are found in the entire document. For example, a neural network may identify a numerical sequence in the bottom-left corner of a document enclosed by characteristic boldfaced bar-colon punctuation mark as a bank routing number. Consequently, a neural network trained to take into account a context of the whole document may be capable of more accurately identifying other fields of the same document as, e.g., address, amount, band account number, signature, or other fields typically present on a personal check. A neural network trained in accordance with implementations of this disclosure may be applied to identification of any type of documents and may enable efficient field detection, thus improving both the accuracy of identification as well as the processing speed of a computing device implementing such identification.

FIG. 1A is a block diagram of an example computer system 100 in which implementations of the disclosure may operate. As illustrated, system 100 can include a computing device 110, a repository 120, and a server machine 150 connected to a network 130. Network 130 may be a public network (e.g., the Internet), a private network (e.g., a local area network (LAN) or wide area network (WAN)), or a combination thereof.

The computing device 110 may be a desktop computer, a laptop computer, a smartphone, a tablet computer, a server, a scanner, or any suitable computing device capable of performing the techniques described herein. In some implementations, the computing device 110 can be (and/or include) one or more computing devices 1300 of FIG. 13.

A document 140 may be received by the computing device 110. The document 140 may include any suitable text(s), image(s), or table(s), including one or more characters (e.g., letters and/or numbers), words, sentences, etc. The document 140 may be of any suitable type, such as "business card," "invoice," "passport," "medical policy," "questionnaire," etc. The type of the document 140 may be specified by a user and communicated to the computing device 110 together with the document 140, in some implementations.

The document 140 may be received in any suitable manner. For example, the computing device 110 may receive a digital copy of the document 140 by scanning a document or photographing the document. Additionally, in instances where the computing device 110 is a server, a client device connected to the server via the network 130 may upload a digital copy of the document 140 to the server. In instances where the computing device 110 is a client device connected to a server via the network 130, the client device may download the document 140 from the server or from the repository 120.

The document 140 may be used to train a set of machine learning models or may be a new electronic document for which field detection and/or classification is desired. In some implementations, if used for training one or more machine learning models (neural networks) 114 for subsequent recognition, the document 140 may be appropriately prepared to facilitate training. For instance, in the document 140, text sequences and/or table elements may be manually or automatically selected, characters may be marked, text sequences/graphics/table elements may be normalized, scaled and/or binarized. In some implementations, text in the document 140 may be recognized using any suitable optical character recognition (OCR) technique.

In one implementation, computing device 110 may include a field detection engine 111. The field detection engine 111 may include a clustering engine 112 to classify the document 140 between two or more document types (clusters). In some implementations, the clustering engine 112 may be integrated into the field detection engine so that a single engine is performing both document clustering and field detection. In some implementations, the field detection engine 111 and the clustering engine 112 may be two independent components. In other implementations, the field detection engine 111 and the clustering engine 112 may share some common components (e.g., some neural network functionality) but may have other components designated for use by only one of the components. The field detection engine 111 and/or the clustering engine 112 may include instructions stored on one or more tangible, machine-readable storage media of the computing device 110 and executable by one or more processing devices of the computing device 110.

In one implementation, the field detection engine 111 and/or the clustering engine 112 may use a set of trained machine learning models 114 for field/table detection and/or classification. The machine learning models 114 are trained and used to detect and/or classify fields in an input document. Some of the machine learning models 114 may be shared by the field detection engine 111 and the clustering engine 112. In the rest of this disclosure, the term "field detection engine 111" shall be understood to also encompass the clustering engine 112.

The field detection engine 111 may preprocess any documents prior to using the documents for training of the machine learning models 114 and/or applying the trained machine learning models 114 to the documents. In some instances, the trained machine learning models 114 may be part of the field detection engine 111 or may be accessed on another machine (e.g., server machine 150) by the field detection engine 111. Based on the output of the trained machine learning models 114, the field detection engine 111 may detect one or more fields and/or tables in the document and can classify each of the fields into one of a plurality of classes corresponding to predetermined field types.

The field detection engine 111 may be a client-based application or may be a combination of a client component and a server component. In some implementations, the field detection engine 111 may execute entirely on the client computing device such as a server computer, a desktop computer, a tablet computer, a smart phone, a notebook computer, a camera, a video camera, or the like. Alternatively, a client component of field detection engine 111 executing on a client computing device may receive a document and transmit it to a server component of the field detection engine 111 executing on a server device that performs the field detection and/or classification. The server component of the field detection engine 111 may then return a recognition result (e.g., a predicted field type of a detected field, or a recognized table, or an association of a word to a field or a table cell) to the client component of the field detection engine 111 executing on the client computing device for storage. Alternatively, the server component of the field detection engine 111 may provide a recognition result to another application. In other implementations, field detection engine 111 may execute on a server device as an Internet-enabled application accessible via a browser interface. The server device may be represented by one or more computer systems such as one or more server machines, workstations, mainframe machines, personal computers (PCs), etc.

Server machine 150 may be and/or include a rackmount server, a router computer, a personal computer, a portable digital assistant, a mobile phone, a laptop computer, a tablet computer, a camera, a video camera, a netbook, a desktop computer, a media center, or any combination of the above. The server machine 150 may include a training engine 151. The training engine 151 can construct the machine learning model(s) 114 for field detection. The machine learning model(s) 114, as illustrated in FIG. 1A, may be trained by the training engine 151 using training data that includes training inputs and corresponding training outputs (correct answers for respective training inputs). The training engine 151 may find patterns in the training data that map the training input to the training output (the answer to be predicted), and provide the machine learning models 114 that capture these patterns. As described in more detail below, the set of machine learning models 114 may be composed of, e.g., a single level of linear or non-linear operations (e.g., a support vector machine (SVM)) or may be a deep neural network, e.g., a machine learning model that is composed of multiple levels of non-linear operations. Examples of deep neural networks are neural networks including convolutional neural networks, recurrent neural networks (RNN) with one or more hidden layers, and fully connected neural networks. In some implementations, the machine learning models 114 may include one or more neural networks as described in connection with FIGS. 2-4.

The machine learning models 114 may be trained to detect fields in the document 140 and to determine the most probable field type for each of the fields in the document 140. For example, the training engine 151 may generate training data to train the machine learning models 114. In one implementations, the training engine 151 may randomly select, from each of the clusters of documents, one or more documents for markup for use as the training documents. In some implementations, the markup may be done by a human operator before the marked-up document is placed (by the human operator or the training engine 151) into a repository 120. The training data may be stored in the repository 120 and may include one or more training inputs 122 and one or more training outputs 124. The training data may also include mapping data 126 that maps the training inputs 122 to the training outputs 124. In some implementations, the mapping data 126 may include the listing of at least some of the fields in the training inputs 122 and the listing of corresponding to the fields values of the fields. For example, the mapping data may include the field "item code" and a listing of some (or all) values that correspond to the field "item code" within a specific training input document. The training inputs 122 may include a training set of documents including text, images, or tables (also referred to as the "training documents"). Each of the training documents may be a document having a known (e.g., marked-up) field. The training outputs 124 may be classes representing field types corresponding to the known fields. For example, a first training document in the first training set may include a first known text field (e.g., "John Smith"). The first training document may be a first training input 122 that may be used to train the machine learning model(s) 114. The training output 124 corresponding to the first training input 122 may include a class representing a field type of the known text field (e.g., "name"). During the training, the training engine 151 can find patterns in the training data 126 that can be used to map the training inputs to the training outputs. The patterns can be subsequently used by the machine learning model(s) 114 for future predictions. For example, upon receiving an input of unknown text fields including unknown text (e.g., one or more unknown words), the trained machine learning model(s) 114 may predict a field type to which each of the unknown text fields belongs and may output a predicted class that identifies the predicted field type as an output. As another example, the trained machine learning model(s) may look for specific fields that are of interest to the client (e.g., those fields that have been designated by the client to be of importance) and determine all values (e.g., alphanumerical strings) in the document that correspond to such fields.

The repository 120 may be a persistent storage capable of storing documents as well as data structures to perform character recognition in accordance with implementations of the present disclosure. The repository 120 may be hosted by one or more storage devices, such as main memory, magnetic or optical storage based disks, tapes or hard drives, NAS, SAN, and so forth. Although depicted as separate from the computing device 110, in an implementation, the repository 120 may be part of the computing device 110. In some implementations, repository 120 may be a network-attached file server, while in other implementations content repository 120 may be some other type of persistent storage such as an object-oriented database, a relational database, and so forth, that may be hosted by a server machine or one or more different machines coupled to the via the network 130.

In some implementations, the training engine 151 may train one or more artificial neural networks (models 114) that each comprise multiple neurons to perform field detection in accordance with some implementations of the present disclosure. Each neuron may receive its input from other neurons or from an external source and may produce an output by applying an activation function to the sum of weighted inputs and a trainable bias value. A neural network may include multiple neurons arranged in layers, including an input layer, one or more hidden layers, and an output layer. Neurons from adjacent layers are connected by weighted edges. The edge weights are defined at the network training stage based on a training dataset that includes a plurality of documents with known classification of fields. In an illustrative example, all the edge weights may be initially assigned some random values. For every input 122 in the training dataset, the training engine 151 may activate the appropriate neural network (selection of the appropriate neural network may be performed by the clustering engine 112. The observed output of the neural network OUTPUT$_{NN}$ (TRAINING INPUT) is compared with the desired training output 124 specified by the training data set:

Compare: OUTPUT$_{NN}$ (TRAINING INPUT) vs. TRAINING OUTPUT

The resulting error—the difference between the output of the neural network OUTPUT$_{NN}$ and the desired TRAINING OUTPUT is propagated back to the previous layers of the neural network, in which the weights are adjusted so as to modify the OUTPUT mi and make it closer to the TRAINING OUTPUT. This adjustment may be repeated until the output error for a particular training input 122 satisfies a predetermined condition (e.g., falling below a predetermined threshold). Subsequently, a different training input 122 may be selected, a new OUTPUT$_{NN}$ may be generated, a new series of adjustments may be implemented, and so on, until the neural network is trained to a sufficient degree of accuracy. In some implementations, this training method may be applied to training one or more artificial neural networks illustrated in with FIGS. 2-4.

Once the machine learning models 114 are trained, the set of machine learning models 114 can be provided to field detection engine 111 for analysis of new documents. For example, the field detection engine 111 may input a new document 140 and/or features of the document 140 into the set of machine learning models 114. The field detection engine 111 may obtain one or more identification outputs from the set of trained machine learning models and may extract, from the identification outputs, a predicted field type of the fields detected and/or identify tables in the document 140. The predicted field type may include a probable field type representing a type of a detected field (e.g., "name," "address," "company name," "logo," "email," etc.).

Figure 1B:
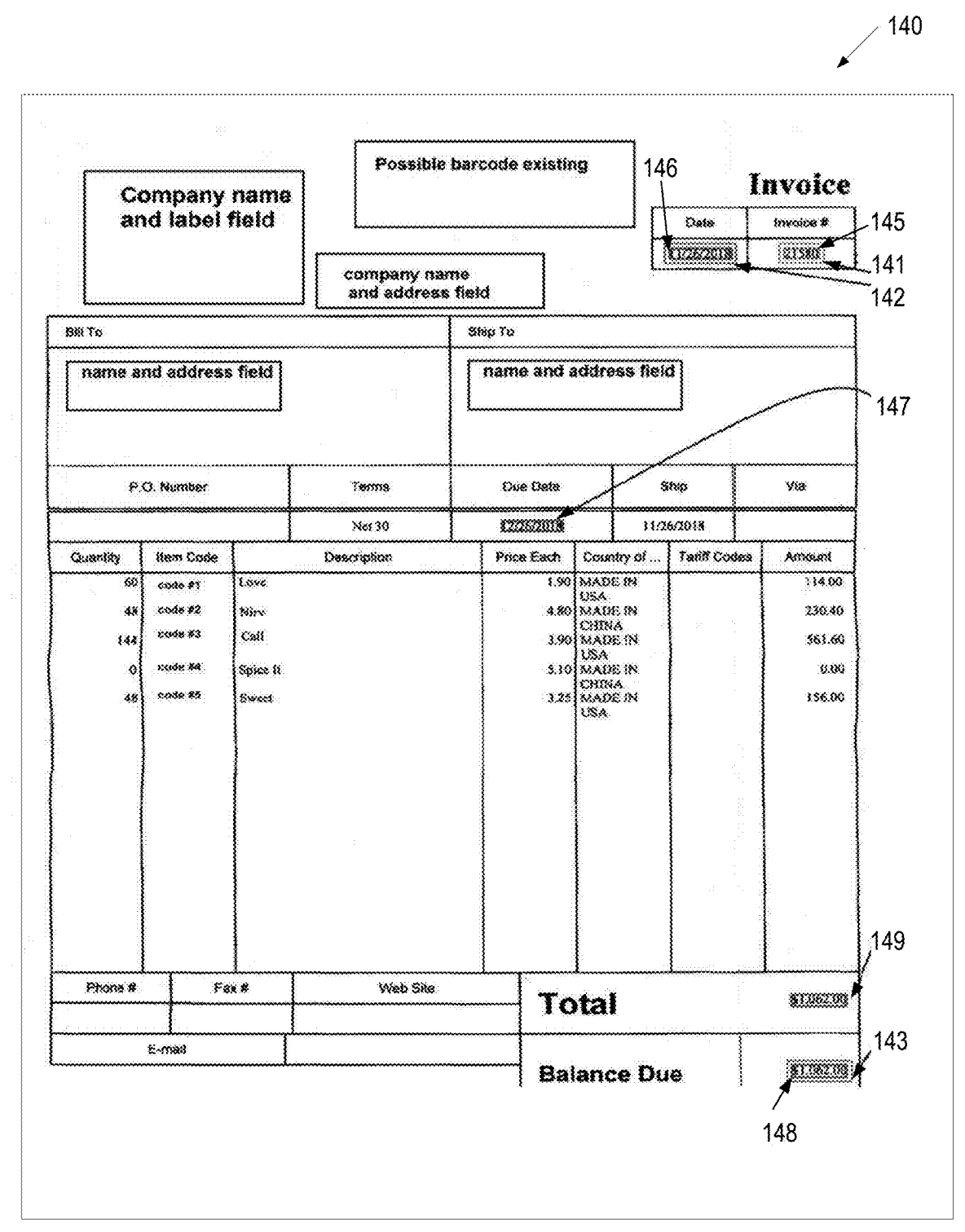

FIG. 1B is an exemplary illustration of a document 140 that may be used to train one or more of the neural networks that may operate in accordance with some implementations of the present disclosure. As shown, the document 140 (e.g., an invoice) may include a variety of fields, such as "company name and label (logo)," "company name and address," "barcode," "name and address" of a person to be billed, "name and address" of a person to receive the shipment," "invoice number," "total," "date," "quantity," and so on. The client, who has received the document 140, may be most interested in some subset of the fields, such as "invoice number," "date," "total," etc. The document 140 may be used as a training input 122 to train one or more of the models 114 to recognize these fields.

In one implementation, one or more fields in the document 140 may be marked-up for use as the training input 122. For example, the field "invoice number" containing the value "21580" may be marked by enclosing it into a box 141 (shown as the dotted rectangle around the value). The value "12/26/2018" within the field "date" may be similarly marked via another dotted box 142 and the value "$1,062.00" within the field "balance due" may be marked with a dotted bot 143. The document 140 prepared as a training input 122 may have a mapping data 126 associated with the document 140. The mapping data 126 may identify the boxes 141-143 as corresponding to the fields "invoice number," "date," and "balance due." For example, the mapping data may identify correspondence between the coordinates of the marked-up boxes and the respective fields. In some implementations, the boxes may be color coded, e.g., the box that corresponds to the "invoice number" field may be green, the box indicating the "date" value may be red, and the box that corresponds to the "balance due" field may be blue. The marked-up document 140 may not identify all values of the same or similar field(s). For example, as shown in FIG. 2, the value of the "ship date" field and the "due date" field may not be marked up.

After the model 114 is trained based on the marked-up document 140, the model 114 may be capable to find and identify fields and their values in the document 140 that have been marked up for training as well as the fields/values that have not been previously identified. For example, an output of the trained model 114 may include a box 145 around the "invoice number" value, a box 146 around the "date" value, and a box 148 around the "balance due" value (indicated as solid boxes). In addition, the trained model 114 may identify the value "12/26/2018" of the "due date" field 147 and the value "$1,062.00" of the "total" field 149.

Figure 2A:
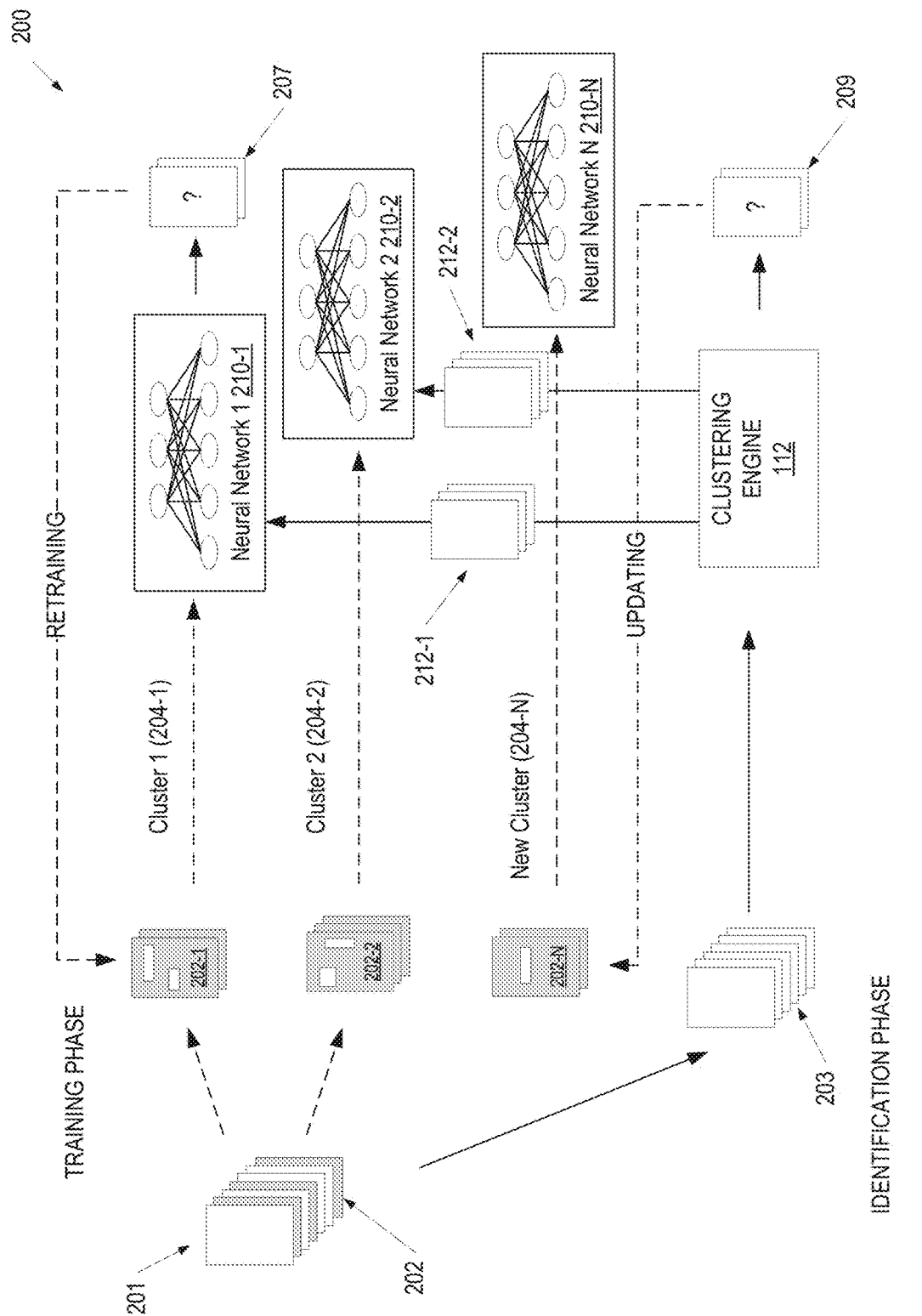
FIG. 2A is a schematic diagram illustrating example operations of a field detection engine that utilizes a clustering engine and a plurality of neural networks for identification of fields in documents, in accordance with some implementations of the present disclosure.

FIG. 2A is a schematic diagram illustrating example operations 200 of a field detection engine (e.g., field detection engine 111) that utilizes a clustering engine and a plurality of neural networks for identification of fields in documents, in accordance with some implementations of the present disclosure. The input into the field detection engine 111 may be a stack of documents 201. All documents of the stack 201 may be received at the same time, in some implementations. In other implementations, the documents of the stack 201 may be received over an extended period of time and the processing of various documents of the stack may be performed at different times. Herein, it will be assumed that the stack of documents 201 may include a collection of physical documents and/or electronic copies of documents (e.g. unstructured electronic documents). If physical (e.g., paper, film, etc.) documents are received with the stack 201, the field detection engine 111 or the computing device 110 (or the server machine 150) may obtain images of the physical documents and convert the images into digital images (e.g., by scanning) belonging to some digital format (JPEG, TIFF, GIG, BMP, CGM, SVG, and so on). The field detection engine 111 may also perform an OCR of the digital image to obtain an OCR text of the document and, in some implementations, to partition the OCR text into a plurality of symbol sequences representing various words, numbers, sentences, pictures, etc., of the document.

Some documents of the stack of documents 201 may be selected for training of the neural networks (models) of the field detection engine 111. In some implementations, the training documents 202 (indicated by shading) may be randomly selected from the stack of documents 201. In some implementations, a human operator (e.g., an administrator on the client side) may select the training documents 202. The training documents 202 may be marked-up with the fields of interest (to the client) identified. The markup may be performed by a human operator (e.g., by the same (or a different) operator who selected the training documents). The human operator may be an employee or an agent of the client. In some implementations, the markup may itself be performed by a computer algorithm, such as an algorithm based on flexible field descriptors.

During the training phase, the training documents 202 may be separated into clusters 204 with each cluster corresponding to a particular vendor or a particular type of a document. (The operations of the training phase are indicated in FIG. 2A by dashed lines.) For example, documents of one vendor, which may have similar appearance, may be associated with cluster 1 (204-1) while documents of another vendor may be associated with cluster 2 (204-2), and so on. In some implementations, clusters may correspond to a particular document type. For example, mortgage applications may be associated with cluster 1, regardless of which lending institution has issued the application form. In some implementations, a human operator may distribute training documents 202 over different types (clusters) of documents. In some implementations, distribution of the training documents may be performed by the clustering engine 112.

The clustering engine 112 may first determine a layout of the document by, e.g., determining positions (coordinates) of titles, logos, paragraphs, tabs, sentences, words, letters, images, stamps present in the document. Based on the layout of the document, the clustering engine 112 may use one of the clustering algorithms, such as autoencoders (e.g., variational autoencoders), K-means clustering, expectation-maximization algorithms, mean-shift algorithms, termination algorithms, generalization algorithms, singular value decomposition algorithms, or other appropriate algorithms.

In some implementations, the clustering engine 112 may determine one or more numerical values characterizing the layout of the document (for example, of the training document 202, but a similar procedure may also be applied to unmarked documents 203 during the identification phase). Each numerical value may describe a feature of the layout. The features may include distributions of dark and light pixels within a given grid superimposed on the document, presence of various words in the document, frequency of their appearances in the document, and so on. One or more numerical values computed for the layout of the training document 202 may be compared to the corresponding cluster values (centroids). The proximity of the document values to the cluster values may be estimated via a similarity function (affinity function, similarity measure) or a difference function. For example, the layout of the training document 202 may be determined to be described (within a specific clustering algorithm) by document features X, Y, Z, . . . . The j-th cluster may have centroid values of these features that are equal to $X_j$, $Y_j$, $Z_j$, . . . . The difference (similarity) function describing affinity of the document to the j-th cluster may then be determined by calculating the distance (in the feature space) between the layout of the document and each of the cluster centroids, e.g., $$\Delta_j = A(X-X_j)^2 + B(Y-Y_j)^2 + C(Z-Z_j)^2 + \ldots,$$

with some weighting parameters A, B, C, . . . (which may itself be determined via additional training using documents belonging to various clusters). In other implementations, other difference functions may be used. Having determined the difference functions $\Delta_j$ for each of the identified clusters, the clustering engine 112 may determine the appropriate cluster j for which the difference function $\Delta_j$ has the lowest value and, consequently, identify the training document 202 as belonging to the j-th cluster (j-th type of documents).

Based on the identified cluster, the field detection engine 111 may select a neural network (model) that corresponds to the identified cluster of documents. For example, neural network 1 (210-1) may correspond to cluster 1 (204-1), whereas neural network 2 (210-1) may correspond to cluster 2 (204-2), and so on. Some or all of the neural networks 210 may be the models 114 of FIG. 1A. The training documents identified as belonging to a particular cluster may be used to train the neural network corresponding to this particular cluster. Training of each neural network may be performed as described above, by comparing outputs generated by the neural network (in response to the training document inputs) to the training outputs data and adjusting (e.g., using back-propagation) parameters of the neural network (weights, biases, etc., of the neural connections) to minimize the difference between the training outputs and the actual outputs generated by the neural network. For example, the training input may be an image of an invoice and the training output may be a markup of the relevant fields on the image of the invoice.

After one or more neural networks 210 are trained, the trained neural networks may be used during the identification phase to detect fields in unmarked documents 203. (The operations in the identification phase are indicated in FIG. 2A by solid lines.) The input documents may be processed by the clustering engine 112. The clustering engine 112 may separate input documents 203 into multiple stacks for processing by the corresponding neural networks. For example, documents 212-1 identified as belonging to type 1 documents (cluster 1) may be processed by the neural network 1

(210-1), documents 212-1 identified as belonging to type 2 documents (cluster 2) may be processed by the neural network 2 (210-2), and so on (additional neural networks not shown for conciseness). The output of each of the neural networks 210 may be the fields identified in each of the input documents 203 (if such fields are present therein) and the values associated with the identified fields (e.g., a numerical value associated with the field "balance").

In some implementations, a trained neural network (e.g., the neural network 201-1) may fail to identify some of the fields in an input document. In such instances, the field detection engine 111 may flag the input document as having fields that failed to be identified. The flagged documents 207 may be used subsequently to retrain the corresponding neural network. For example, the flagged documents 207 may be marked-up and used to retrain the neural network 201-1. In some implementations, the field detection engine 111 may initiate the retraining once a certain number of flagged documents 207 are accumulated. In some implementations, the field detection engine 111 may initiate the retraining after even a single document 207 is flagged. In some implementations, the field detection engine 111 may initiate the retraining periodically, provided that a certain minimum number of documents has been flagged (the minimum number may be one, two, three, or any other number of documents).

In some implementations, the clustering engine 112 may fail to identify one or more input documents 203 as belonging to an already identified type of documents. For example, one or more input documents 203 may be documents received from a new vendor. The clustering engine 112 may set aside these unclassified documents 209 for use in updating the capabilities of the field detection engine 111. For example, the unclassified documents 209 may be used to establish a new cluster (e.g., cluster 204-N). Before, after, or concurrently with establishing the new cluster, the field detection engine 111 may instantiate a new neural network (e.g., network 210-N). The unclassified documents 209 may be marked-up in the usual manner (e.g., by identifying the fields that are of interest to the client) and used to train the new neural network. Once trained, the new neural network may be used together with previously existing networks to process subsequent document inputs.

Figure 2B:
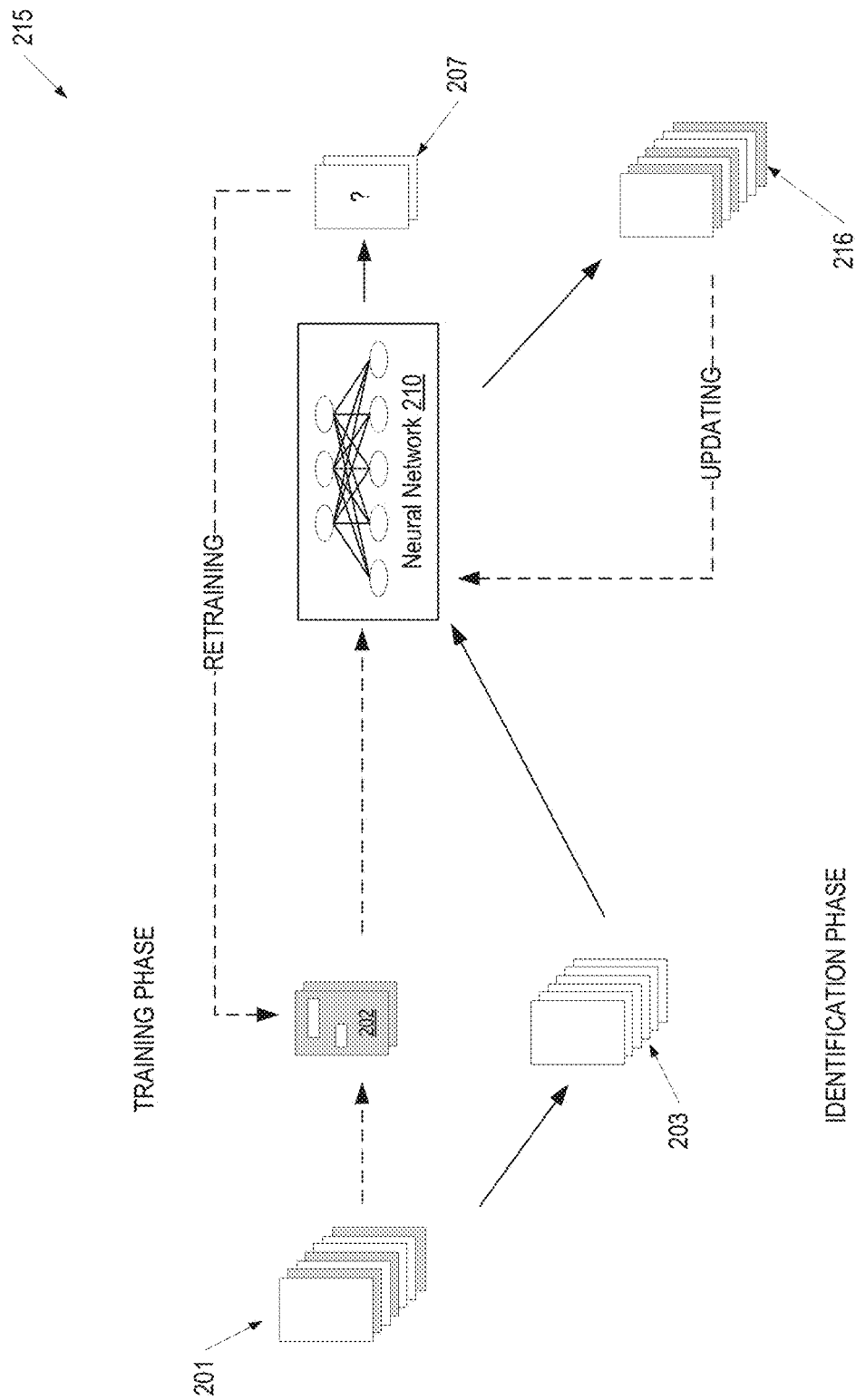
FIG. 2B is a schematic diagram illustrating example operations of the field detection engine that utilizes a single common neural network for identification of fields in documents, in accordance with some implementations of the present disclosure.

FIG. 2B is a schematic diagram illustrating example operations 215 of the field detection engine (e.g., field detection engine 111) that utilizes a single common neural network 210 for identification of fields in documents, in accordance with some implementations of the present disclosure. The example operations 215 may involve training one common neural network 210 using a full stack of documents 201, including documents of different types and/or from different vendors. Some of the documents (e.g. randomly selected documents) of the stack 201 may be marked-up for training (e.g., documents 202) of the neural network 210. After training, new (unmarked) documents 203 may be input into the neural network 210 for field identification. If the neural network 210 misidentified a value of some field or failed to identify all relevant fields in one or more specific documents 207, the document(s) 207 may be flagged (e.g. by the field detection engine 111) and after a corrective mark-up (e.g., by the human operator) used to retrain the neural network 210 (as indicated by the dashed line "RETRAINING").

In some implementations, at least some of the processed documents may be set aside for a subsequent update of the neural network 210. During the update, some of the set-aside documents 216 may be marked-up and used as a training input to update the neural network 210 ("UPDATING"). Such updating may be performed periodically, at specific times, or may be conditioned on accumulating a specific number of processed (or set-aside) documents, or may be performed responsive to an instruction from the client. For example, such instruction may be given by the client if the network 210 makes a significant number of mistakes (e.g., above a certain percentage, such as 1%, 2%, 5%, 10%, etc.). In some implementations, the set-aside documents 216 may represent all previously processed documents 201 or some portion of them, such as a random selection of all previously processed documents. In some implementations, the set-aside documents 216 may be representative of a cross-section of all types/vendors. For example, a certain number of documents of each type (purchasing order, invoice, withdrawal slip, etc.) and/or of documents of each vendor may be randomly set aside for subsequent updates of the neural network 210.

Figure 2C:
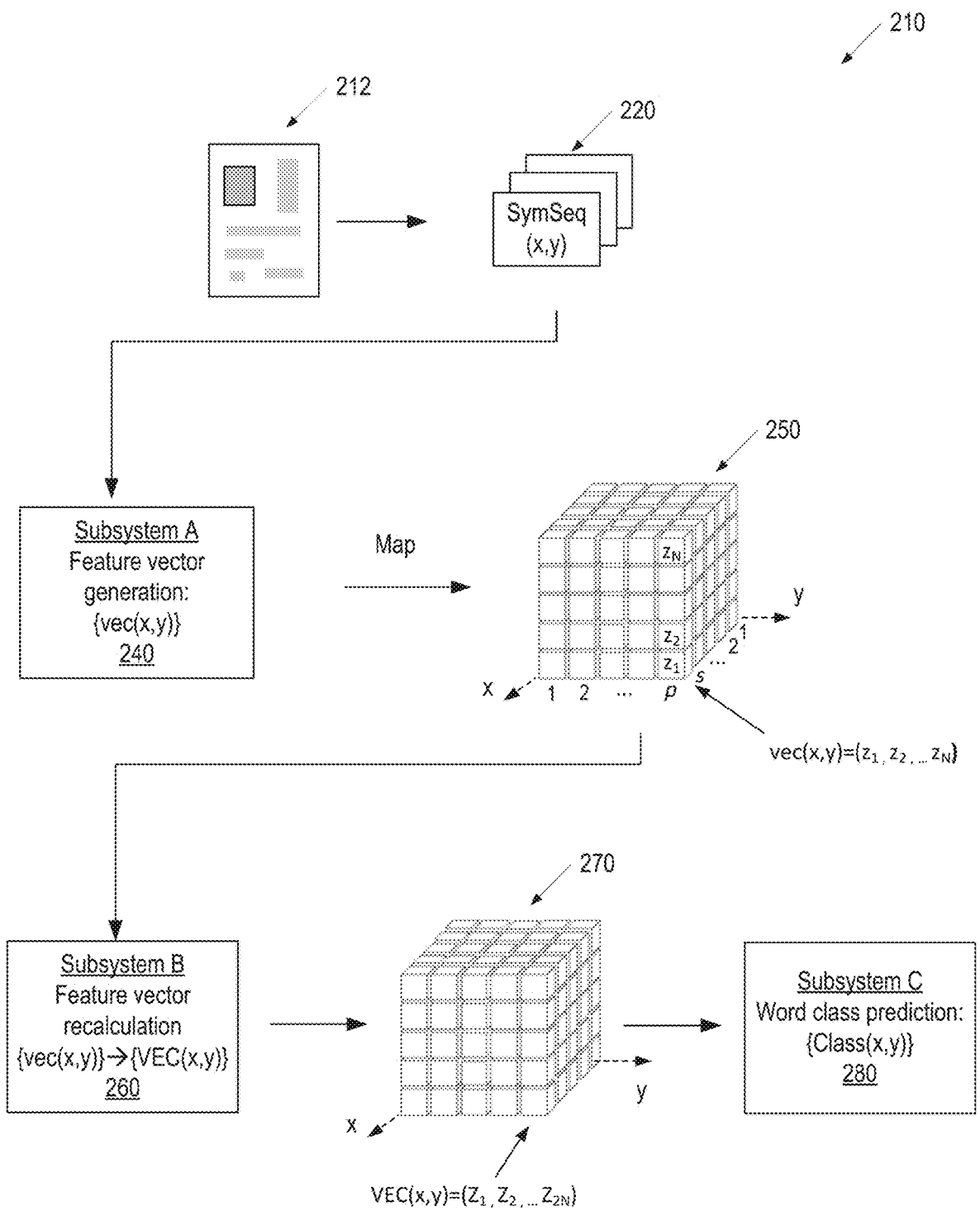
FIG. 2C is a schematic diagram illustrating an example of a neural network that uses global document context for identification of fields, in accordance with some implementations of the present disclosure.

FIG. 2C is a schematic diagram illustrating an example of a neural network 210 that uses global document context for identification of fields, in accordance with some implementations of the present disclosure. The neural network 210 may include multiple neurons that are associated with learnable weights and biases. The neurons may be arranged in layers. Some of the layers may be hidden layers. As illustrated, the neural network 210 may include a subsystem A 240, a subsystem B 260, and a subsystem C 280. Each of the subsystems 240, 260, and 280 may include multiple neuron layers and may be configured to perform one or more functions for field/table detection in accordance with the present disclosure.

The neural network 210 may operate on a document image 212, which may be an image of the document 140, an image of a marked-up document 201, an image of an unmarked document 203, in various implementations. The document image 212 may be obtained by imaging (e.g., scanning, photographing, etc.) of the document 140. The imaging may occur immediately before the document image 212 is processed by the neural network 210, in some implementations. In some implementations, the imaging may occur at some point in the past, and the document image 212 may be obtained from a local or network (e.g., cloud) storage. The document image 212 may undergo optical character recognition (OCR), either immediately before further processing by the neural network 210 or at some point in the past. The OCR may be accompanied with pre-processing of the document image 212 to improve its quality, e.g., scaling, changing the aspect ratio, gray-scaling, normalization, data augmentation, amplification, binarization, and so on.

The outcome of the OCR of the document image 212 may be a set of recognized sequences of symbols SymSeq(x,y) associated with the coordinates x, y of the document image 212. The symbol sequences SymSeq may be include one or more alphanumeric characters that may be combined into syllables, words, and/or sentences. The symbol sequences SymSeq may be one or more punctuation marks, such as a comma, period, ellipses, or any other marks. The sequences SymSeq may be horizontal, vertical, or oblique lines of tables, or three-way or four-way intersections of the lines. The lines may be single, double, etc. The symbol sequences SymSeq may be any combinations of characters, punctuation marks, and/or lines. In some implementations, to generate the symbol sequences SymSeq contained in the document image 212, the field detection engine 111 (or any other component that performs or has performed OCR on the document image 212) may use suitable character recognition methods, divide the text of the document into multiple words, and extract multiple character sequences from the words.

The identified symbol sequences SymSeq may be mapped to the corresponding regions of the document image 212 where these sequences are located. For example, each SymSeq may be associated with one or more sets of coordinates (x,y) that identify locations of the sequences. The coordinates may be Cartesian coordinates or any other (e.g., polar) coordinates that may be convenient in identifying locations of the symbol sequences. A single character, punctuation mark, or a short line may be identified by a single set of coordinates (x,y) whereas longer sequences (words, sentences, long lines) may be identified by multiple sets (x,y), such as the coordinates of the four corners of a box enclosing the sequence, in one implementation. A lines may be identified by the coordinates of the two ends of the line. An intersection of two lines (e.g., a three-way or a four-way intersection) may be identified by the coordinates of the ends of all lines as well as the coordinates of the intersection. In this disclosure, (x,y) shall denote any identification of symbol sequences with one or more set of coordinates, as may be needed for a specific SymSeq.

The field detection engine 111 may input the symbol sequences SymSeq(x,y) into the subsystem A 240 to generate feature vector representations for each of the symbol sequences: SymSeq(x,y)→vec(x,y). Each of the feature vectors vec(x,y) may be a symbolic vector embedding of one of the symbol sequences (e.g., words/sentences, punctuation marks and/or lines), which is also referred to as a word embedding. In some implementations, each of the symbolic vector embeddings may have a certain length (e.g., a predetermined length). When the length of a character sequence is shorter than the certain length, predetermined values may be added to generate a symbolic vector embedding of the predetermine length (e.g., zeros may be added to the vectors). "Symbolic vector embedding" or "vector embedding" as used herein may refer to a vector of real numbers or any other numeric representation of a symbol sequence. A vector embedding may be produced, for example, by a neural network implementing a mathematical transformation on symbols (words/punctuation marks/lines of tables) using embedding functions to map such symbols into their numeric representations.

The vector embeddings vec(x,y)—also referred herein as vector representations of symbol sequences SymSec(x,y) or simply as "vectors"—may be generated using any suitable model or combination of models, such as Word2Vec, GloVe, FastText, etc. The subsystem A 240 may use a plurality of neuron layers, such as an input layer, an output layer, and one or more hidden layers. The subsystem A 240 may be a recurrent neural network (RNN), a character-level RNN, a long short-term memory (LSTM) network, or any other similar network, including any combination of such networks. The subsystem A 240 may operate on an embeddings dictionary that may include vector representations of typical words found in the documents of the pertinent types. The subsystem A 240 may be trained to generate such vector representations of symbol sequences SymSeq(x,y) that have close numerical values vec(x,y) for the words that have close semantic meanings (e.g., "number" and "quantity") or that may be found in close proximity to each other (e.g. "amount" and "tendered"). The subsystem A 240 may be previously trained using training inputs 122 and training outputs 124, as described above. The documents used in training phase—the training inputs 122 and training outputs 124—may be the documents of the same type as the target documents (e.g., invoices, checks, purchasing orders, and so on) that are to be used during the prediction phase. Accordingly, while the dictionary for the vector embeddings SymSec(x,y) may be developed during the training phase for the specific class of target documents, the vector embeddings SymSec(x,y) need not belong to an embeddings dictionary pre-trained on some wider class of documents (e.g., books, newspapers, magazines) that are unrelated to the specific class of target documents. The trained first subsystem 240 may be capable of predicting what symbol sequence SymSeq follows (or precedes, or is adjacent along a vertical or horizontal direction) a particular SymSeq. The predictions of the first subsystem 240 may come in the form of probabilities. For example, the trained subsystem A 240 may be able to predict that the word "amount" is preceded with the word "total" with 30% probability and is followed with the word "tendered" with 15% probability.

In some implementations, the output feature vector representations vec(x,y) may be independent of the specific location (x,y) of the symbol sequence SymSeq. More specifically, the coordinates (x,y) of the symbol sequence SymSeq(x,y) may serve as a geometric identifier of the sequence, but its vector representation vec(x,y) may be the same regardless of where in the image the sequence is located. For example, the subsystem A 240 may assign the same probabilities that various character sequences SymSeq (such as "city," state") are found in the proximity of the word "street." In other implementations, the vector representations vec(x,y) of the same symbol sequence SymSeq may differ depending on the location of the sequence within the document (or within the document image 212). For example, the output of the subsystem A 240—the vector representations of a word, e.g., "escrow"—may vary depending on the location (x,y) of the word inside the document image 212. Accordingly, the vector representation of the word "escrow" may be closer (in the vector space) to representations of one set of words, if the word "escrow" is encountered in the middle of the document, but closer to representations of a different set of words, if the word escrow is found near the bottom of the document. The vector representations of a particular word may further depend on the type of the document. For example, the word "amount" may be represented differently in a real estate contract and in a purchasing order.

As a result, if M symbol sequences (characters, punctuation marks, words, sentences) are identified in the document image 212 and input into the subsystem A 240, the output of the first subsystem may be a set of M vectors (feature vectors) {vec(x,y)}. Each of the M vectors vec(x,y) may depend on the context of the whole document—the type of the document, the number of words in the document, the layout of text in the document, the locations of some or all words in the document, and so on.

The vector space for vectors vec(x,y) may have a number of dimensions N chosen based on the complexity of the document. In some implementations, N may be equal to 128 (32, 64, or any other number). The number N may be chosen to be greater to represent symbol sequences of a complex document and, conversely, smaller for simpler documents having limited dictionary of words. For a given number of dimensions N, each vector may have N components, vec(x, y)=$(z_1, z_2, \ldots z_N)$, wherein $z_j$ may be a binary number, a decimal number, or any other number accessible to a computer. In some implementations, some of the vectors vec(x, y) determined by the subsystem A 240—e.g., shorter words or punctuation marks—may have fewer than N numbers. In such implementations, the remaining components of the vector may be assigned zero vales, so that the overall length of all vectors may be the same.

The output of the subsystem A 240 may be schematically illustrated as a parallelepiped (cube) 250 composed of the components of individual vectors in the set {vec(x,y)}. Along the in-plane directions x and y, the area of the document image 212 may be discretized into p cells along the direction of x and s cells along the direction of y (e.g., p=32 and s=64, in one exemplary implementation). A word (character, sentence) centered over a particular cell (x,y) may have its vector representation vec(x,y)=($z_1, z_2, \ldots z_N$) visualized as a sequence of blocks (cells) stacked along the third direction, as shown schematically in FIG. 2C for a corner vector. Other vectors may be similarly stacked into other cells of the parallelepiped 250 herein referred as the "cube" even though it should be remembered that the number of cells along each of the three directions may be different from the number of cells along the other two, with s×p×N being the total number of cells in the "cube." To form the cube, the function Map (e.g., Gather) may be deployed.

Some of the cells (or vertical stacks) of the cube 250 may be empty (e.g., filled with zeros). For example, the cells stacked above the coordinates (x,y) that correspond to empty spaces of the document image 212 may have all zeros. A row (along the x-direction) or a column (along the y-direction) may have all zeros for all its vectors if such a row or a column does not contain any characters (e.g., falls between the lines of the text). Even those rows/columns that contain characters may have some (or even most) of its cells filled with zeros. For example, if an j-th row contains ten words, and the horizontal dimension of the document image 212 is discretized into 32 cells, only 10 non-zero vectors vec(x,y) may be present in this row, interspaced with 22 null vectors. In some implementations, vectors(x,y) that do not have at least one non-zero component may be eliminated from the cube.

The cube 250 having s×p×N cells containing a set {vec (x,y)} of M identified vectors corresponding to identified symbol sequences may be input to the subsystem B 260 for vector recalculation {vec(x,y)}→{VEC (x,y)} in view of the global context of the whole document. The subsystem B 260 may have one or more neural networks (as explained below, in reference to FIG. 3), which may modify the components of the vector representations vec(x,y) of the symbol sequences in view of all other vectors of the cube 250. As a result, the recalculated values VEC(x,y)=($Z_1, Z_2, \ldots Z_{2N}$) may account for the context of the entire document. More specifically, the recalculated values VEC(x,y)=($Z_1, Z_2, \ldots Z_{2N}$) output by the subsystem B 260 may account for the presence of all other symbol sequences in the document as well as the content of each of these symbol sequences.

The new cube 270 containing the set of the recalculated vectors {VEC(x,y)} may be input on the subsystem C 280 to predict a class of each symbol sequence identified in the document image 212. In some implementations, the field detection engine 111 can use the machine learning model(s) 114 to generate hypotheses about symbol sequences SymSeq 220 of the document (represented with the set of vectors {VEC(x,y)}) belonging to various classes of the fields in the input document 140, as described in more detail below in reference to FIG. 4. The classes of the field may be "vendor name," "type of merchandize," "quantity of merchandize," "order number," "type of shipment," "place of delivery," "date of the order," "payment type," and so on. In some implementations, various classes of the fields may be predetermined for at least some of the document types and input into the third subsystem 280 as a set of external parameters.

In other implementations, various classes that may be present in the document may be determined by the third subsystem 280, which may be trained to ascertain the type of the input document (e.g., "invoice," "order," "bill," etc.) and anticipate the classes of the fields that may likely be present in the determined type of the input document.

Some of the components illustrated in FIG. 2C may be combined. For example, subsystems A, B, and C may be realized as a single neural network, in one implementation. In some implementations, subsystems A and B may be realized as a single network while subsystem C may be realized as by a separate network. Similarly, in some implementations, subsystems B and C may be realized as a single network while subsystem A may be realized as by a separate network. In those implementations where multiple subsystems are realized by a combined single network, the functions of different subsystems in the combined network may be implemented by separate dedicated layers or by shared layers, or by some combination thereof.

Figure 3:
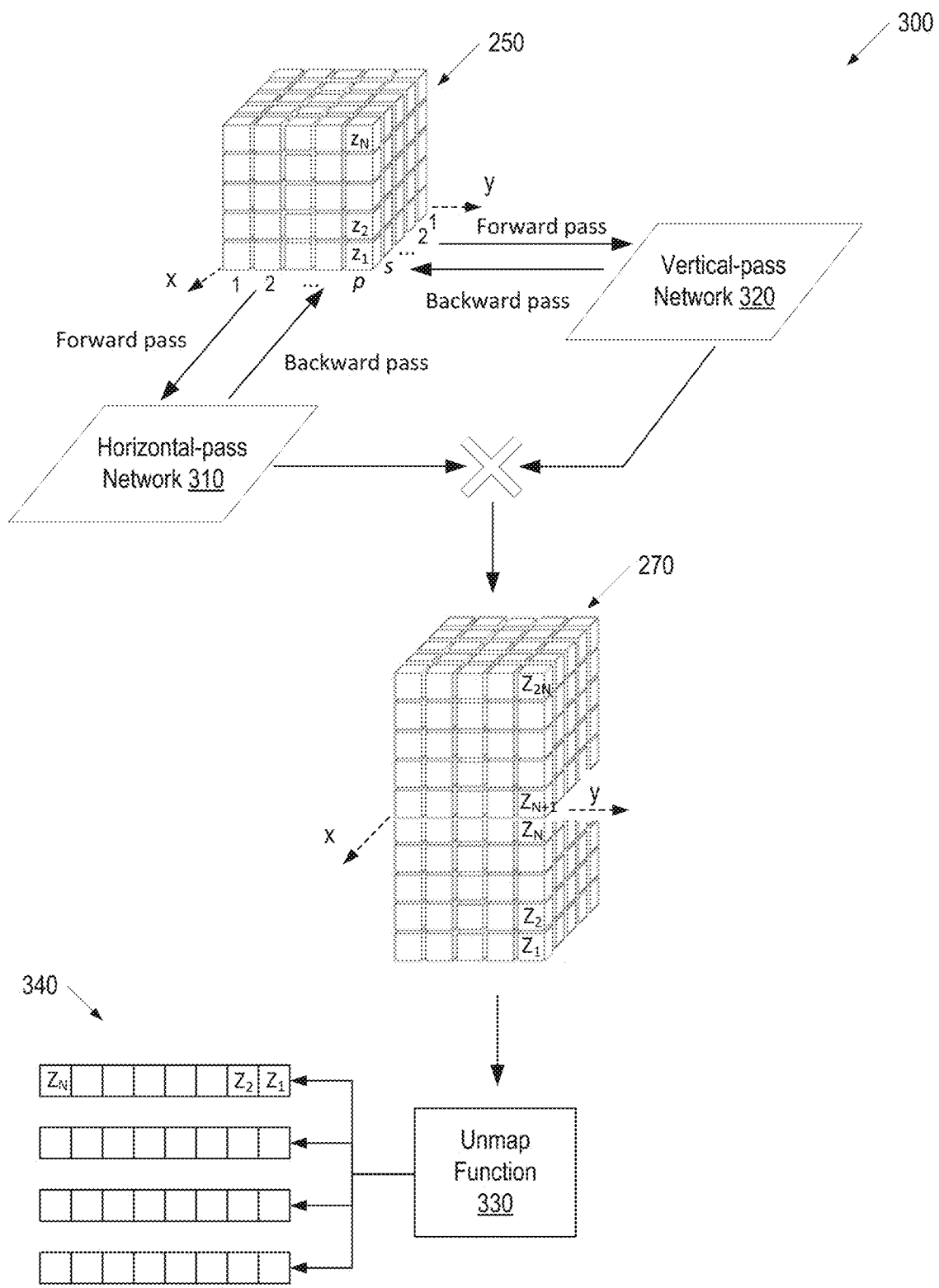
FIG. 3 is a schematic diagram illustrating an example neural network subsystem that recalculates the values of the vector representations of various symbol sequences of an input document based on the global document context, in accordance with some implementations of the present disclosure.

FIG. 3 is a schematic diagram illustrating an example neural network subsystem 300 that recalculates the values of the vector representations of various symbol sequences of an input document based on the global document context, in accordance with some implementations of the present disclosure. The neural network subsystem 300 may be the subsystem B 260, in one implementation. The neural network subsystem 300 may be implemented by the field detection engine 111.

The cube 250 containing a set {vec(x,y)} of vectors corresponding to identified symbol sequences SymSeq may be input into the subsystem 300. The subsystem 300 may include one or more neural networks each containing a plurality of layers of neurons. In some implementation, the subsystem 300 may include two neural networks, a horizontal-pass network 310 and a vertical-pass network 320. In some implementations, the horizontal-pass network 310 and the vertical-pass network 320 may be long short-term memory (LSTM) networks. In other implementations, the horizontal-pass network 310 and the vertical-pass network 320 may be RNNs or Attention-based LSTM networks.

The horizontal-pass network 310 and the vertical-pass network 320 may perform a plurality of passes along the horizontal (x) and vertical (y) dimensions of the cube 250. More specifically, the horizontal-pass network 310 may select, in consecutive iterations, each one of the s columns of the base (the bottom plane of cells) and the vertical-pass network 320 may similarly select each one of the p rows of the base. The null vectors (those that have all zeros) may be ignored, e.g. skipped over. The horizontal-pass network 310 and the vertical-pass network 320 may recalculate vector components, vec(x,y)=($z_1, z_2, \ldots z_N$)→VEC(x,y)=($Z_1, Z_2, \ldots Z_N$), for some or all of the vectors {vec(x,y)} so that the values VEC(x,y)=($Z_1, Z_2, \ldots Z_N$) are recalculated based on the values of all vectors {vec(x,y)} of the document and, therefore, the new values {VEC(x,y)} may depend on the context (type, content) of the entire document.

In one exemplary implementation, the vector recalculation may be performed as follows. The horizontal-pass network 310 may iteratively select consecutive values of columns j, such that 1≤j≤s. For each j, the horizontal-pass network 310 may identify a plane of vector components $z_1$ ($x_j,y_k$), $z_1$ ($x_j,y_k$), ... $z_N$ ($x_j,y_k$) located in the cell of the cube 250 having the same column index j but various possible row indices k. The horizontal-pass network 310 may then use parameters (e.g., weights and biases) of the network 310 to modify the values of the vector components $z_1$ ($x_j,y_k$), $z_1$ ($x_j,y_k$), ... $z_N$ ($x_j,y_k$) based on the values in the preceding plane, $z_1(x_{j-1},y_k)$, $z_1(x_{j-1},y_k)$, ... $z_N(x_{j-1},y_k)$, or a fixed number (two, three, ten, or any other number) of preceding planes. In some implementations, the values for the column plane j may be recalculated based on all preceding planes, having indices from 1 to j−1. After recalculation of the values of the vector components $z_1(x_j,y_k)$, $z_1(x_j,y_k)$, ... $z_N(x_j,y_k)$ for the column-plane j, the horizontal-pass network 310 may proceed with recalculating the values of the vector components for the next plane, $z_1(x_{j+1},y_k)$, $z_1(x_{j+1},y_k)$, ... $z_N(x_{j+1},y_k)$, and so on, until all columns of the cube 250 are recalculated.

The horizontal-pass network 310 may perform multiple horizontal passes as described above. In some implementations, some of the passes may be performed in the backward direction, e.g., starting with j=s and proceeding towards smaller values of j until the column j=1 is reached and recalculated.

The vertical-pass network 320 may likewise select, in consecutive iterations, each one of the p rows of the base plane of cells of the cube 250 and similarly recalculate the vector components based on the values of all vectors {vec (x,y)} of the document. For example, the vertical-pass network 320 may iteratively select consecutive values of rows k, such that 1≤k≤p. For each k, the vertical-pass network 320 may identify a plane of vector components $z_1(x_j,y_k)$, $z_1(x_j,y_k)$, ... $z_N(x_j,y_k)$ located in the cell of the cube 250 having the same row index k but various possible column indices j. The vertical-pass network 320 may then use parameters (e.g., weights and biases) of the network 320 to modify the values of the vector components $z_1(x_j,y_k)$, $z_1(x_j,y_k)$, ... $z_N(x_j,y_k)$ based on the values in the preceding plane, $z_1(x_j,y_{k-1})$, $z_1(x_j,y_{k-1})$, ... $z_N(x_j,y_{k-1})$, or a fixed number (two, three, ten, or any other number) of preceding planes. In some implementations, the values for the row-plane k may be recalculated based on all preceding row-planes, having indices from 1 to k−1. After recalculation of the values of the vector components $z_1(x_j,y_k)$, $z_1(x_j,y_k)$, ... $z_N(x_j,y_k)$ for the row-plane k, the horizontal-pass network 310 may proceed with recalculating the values of the vector components for the next plane, $z_1(x_j,y_{k+1})$, $z_1(x_j,y_{k+1})$, ... $z_N(x_j,y_{k+1})$, and so on, until all rows of the cube 250 are recalculated.

The parameters of the horizontal-pass network 310 may be different from the parameters of the vertical-pass network 320. The parameters of the two networks may be determined during a training phase by selecting one or more training inputs 122, determining the output of the combined network (subsystem 300), comparing the output with training outputs 124 and backpropagating errors through the layers of networks on the horizontal-pass network 310 and the vertical-pass network 320.

During the training phase, the horizontal-pass network 310 and the vertical-pass network 320 may perform a plurality of passes until the error of the output of the subsystem 300 falls below some pre-determined error. The passes by the horizontal-pass network 310 and the vertical-pass network 320 may be performed in a variety of orders. For example, in one implementation, the first pass may be a forward pass by the horizontal-pass network 310, the second path may be a backward path by the horizontal-pass network 310, the third pass may be a forward path by the vertical-pass network 320, the fourth pass may be a backward path by the vertical-pass network 320, and so on. This process may be repeated a number of times. Alternatively, in another implementation, the first pass may be a forward pass by the horizontal-pass network 310, the second path may be a forward path by the vertical-pass network 320, the third pass may be a backward path by the horizontal-pass network 310, the fourth pass may be a backward path by the vertical-pass network 320, and so on. In another implementation, each of the two networks may perform multiple (e.g., two, three, or more) passes in the same direction (forward or backward), before the same network may perform multiple passes in the opposite direction, or before the other networks performs multiple passes (in either direction). A person skilled in the technology will appreciate that it is possible to realize a virtually unlimited number of various combinations of the two networks performing passes in the two directions.

The result of the training phase may be a set of parameters (e.g., biases and weights) for the horizontal-pass network 310 and a set of parameters for the vertical-pass network 320. The two sets may be different. Furthermore, each of the two networks may have a set of parameters that is different for forward and backward passes. Additionally, while in some implementations the parameters (e.g., for backward passes of the horizontal-pass network 310) may be independent of where the recalculated column-plane is located, in other implementations, the parameters may depend on such locations. For example, the parameters may be different for column-planes (row-planes) located near the edges of the document from the planes located near the middle of the document.

The output of the horizontal-pass network 310 and the output of the vertical-pass network 320 may be concatenated to produce a recalculated cube 270. (The concatenation operation is depicted on FIG. 3A with a white cross.) The concatenated vectors may have recalculated values VEC(x,y)=($Z_1$, $Z_2$, ... $Z_N$, $Z_{N+1}$, ... $Z_{2N}$), having first N components that represent the output of the horizontal-pass network 310 and the last N components that represent the output of the vertical-pass network 320 (or vice versa). For example, if the original vectors vec(x,y) that form the (input) cube 250 have 128 components, the recalculated vectors VEC(x,y) that form the (output) cube 270 may have 256 components, in one exemplary implementation.

In the prediction phase, the subsystem 300 may operate in the same order of combinations as in the training phase, in one implementation. In other implementations, the number of passes in the prediction phase may be less (or greater) than in the training phase. For example, if the number of documents to be analyzed is significant, the number of passes (per document) in the prediction phase may be significantly reduced compared with the training phase.

During the prediction phase, upon the completion of a predetermined number of passes (the number of passes may be predetermined during training phase, as the number sufficient to achieve a required accuracy), the subsystem 300 may output the cube 270 having the recalculated values of the vector components VEC(x,y)=($Z_1$, $Z_2$, ... $Z_N$, $Z_{N+1}$, ... $Z_{2N}$), An Unmap (e.g. Scatter) function 330 may unmap the recalculated cube 270 into a set of recalculated unmapped vectors 340 having the original length (N components). For example, in some implementations, the Unmap function 330 may combine two components of the vector ($Z_1$, $Z_2$, ... $Z_N$, $Z_{N+1}$, ... $Z_{2N}$), e.g., according to $Z_k + Z_{N+k} \rightarrow Z_k$, or according to some other mapping scheme that reduces the number of vector components from 2N to N. In other implementations, the Unmap function 330 may first eliminate zero components of the vector ($Z_1$, $Z_2$, ... $Z_N$, $Z_{N+1}$, ... $Z_{2N}$) and select the first N (the last N, the largest N, etc.) remaining components. In another implementation, a dense neural network layer having 2N inputs and N outputs may reduce the vector VEC(x,y)=($Z_1$, $Z_2$, ... $Z_N$, $Z_{N+1}$, ... $Z_{2N}$) into a reduced vector VEC(x,y)=($Z_1$, $Z_2, \ldots Z_N$). The reduced (unmapped) vectors 340 may include the coordinate of the corresponding symbol sequences SymSeq. In some implementations, the reduction of the length of each of the vectors from 2N to N may involve just that one vector; namely, determination of the components of the reduced vector identified by coordinates (x,y) may not involve components of other vectors (e.g., identified by different coordinates). Because the unmapped vectors 340 output by the subsystem 300 are recalculated based on values of all vectors of the document, the unmapped vectors 340 depend on the context of the entire document.

Figure 4:
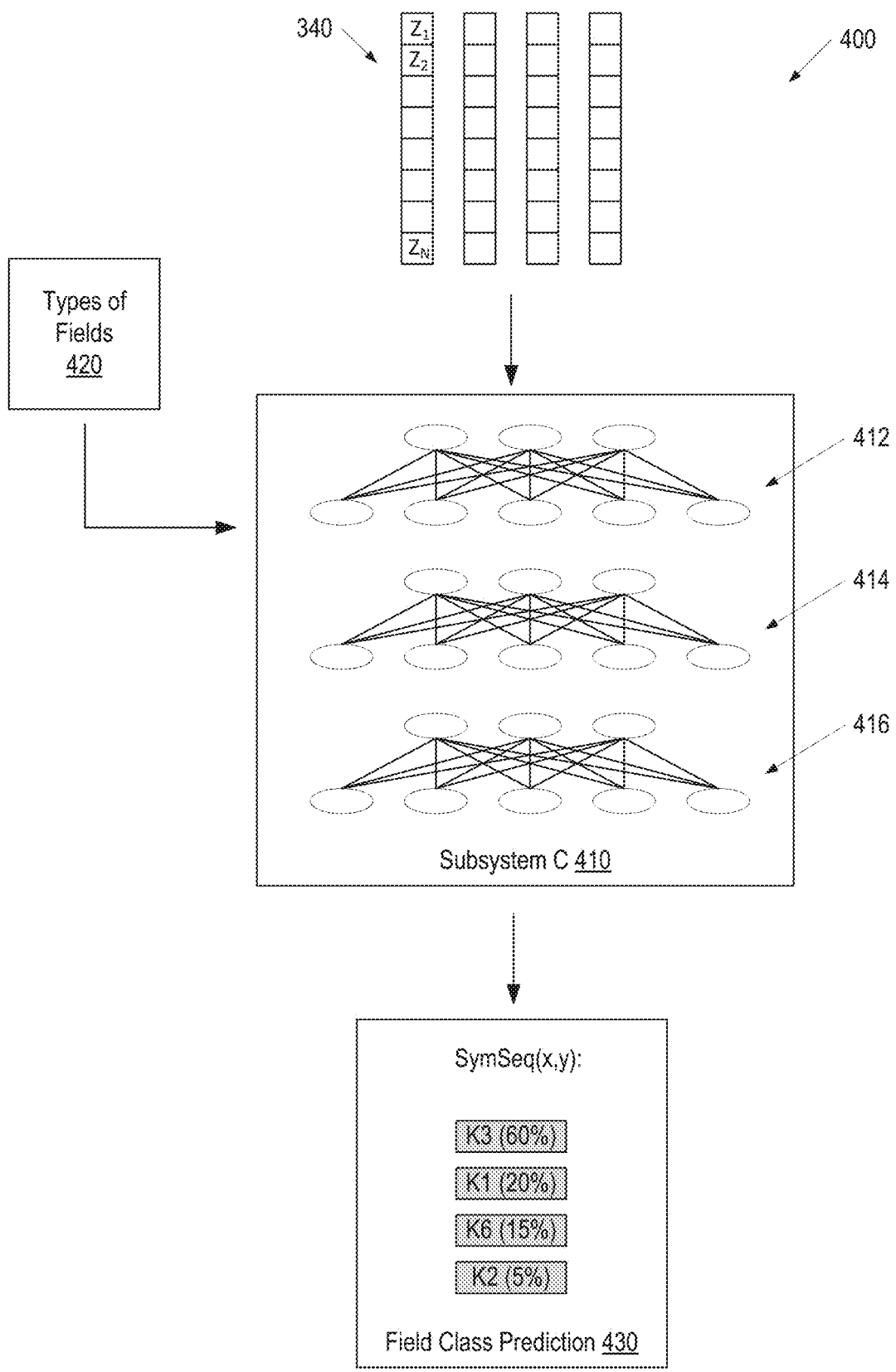
FIG. 4 is a schematic diagram illustrating operations of an example neural network subsystem that predicts a class of the field populated with a particular symbol sequence identified in the document image, in accordance with some implementations of the present disclosure.

FIG. 4 is a schematic diagram illustrating operations 400 of an example neural network subsystem 410 that predicts a class of the field populated with a particular symbol sequence identified in the document image, in accordance with some implementations of the present disclosure. The neural network subsystem 410 illustrated in FIG. 4 may be the subsystem C 280, in one implementation. The neural network subsystem 410 may be implemented by the field detection engine 111. The neural network subsystem 410 may use, as input, the output of the subsystem B (e.g., subsystem 300). More specifically, the neural network subsystem C 410 may input the recalculated values of the vector components VEC(x,y)=($Z_1, Z_2, \ldots Z_N$) corresponding to the identified symbol sequences SymSeq(x,y). The subsystem C 410 may have one or more fully-connected/dense neuron layers, e.g., layers 412, 414, 416. Some of the fully connected layers may use a softmax function. One or more fully-connected layers 412, 414, and/or 416 may be connected to each other by layers that are not fully-connected, in some implementations.

In some implementations, the subsystem 410 may use additional field type input 420 that may include listings of field for various types of documents. For example, in some implementations, the type of field input 420 may contain information that an invoice document may include such fields as "seller," "buyer," "seller's address," "buyer's address," "type of goods," "quantity of goods," "method of payment," "deposit amount," "delivery date," "delivery date," "signature," and so on. In some implementations, the field type input may be provided as part of the training input(s) 122 and training output(s) 124 and the subsystem 410 may determine the number and type of fields encountered in various types of documents as part of the training process (phase).

The subsystem C 410 may classify each of the symbol sequences SymSec(x,y) into one of a plurality of predefined classes. Each of the predefined classes may correspond to one of the field types to be detected. In order to classify symbol sequences, the subsystem C 410 may generate hypotheses that some or each of the identified symbol sequences—described by the corresponding vectors 340—belong to one of the fields of the document. The subsystem C 410 may further determine probabilities of a specific symbol sequence belonging to various types of fields in the document (determined during the training phase or explicitly input). The field class prediction output 430 of the subsystem C 410 may include an association for each of the symbol sequences SymSeq(x,y) with various classes K1, K2, K3, K4, . . . For example, as indicated in FIG. 4, the associations may be by means of assigning various probabilities for the sequences SymSeq(x,y) to belong to the corresponding types of fields to be detected. For example, the subsystem C 410 may determine that a particular sequence SymSeq(x,y) may belong to class K3 with 60% probability, to class K1 with 20% probability, to class K6 with 15% probability, and to class K2 with 5% probability.

To determine the field class predictions 430 for various symbol sequences of the document, the subsystem C 410 may first generate a plurality of hypotheses that each of the identified SymSeq(x,y) may belong to a given class Kn. For example, a hypothesis may be that a set of several words that are located in the vicinity of each other (e.g., in the same line) may belong to the same field (e.g., vendor's address). Another hypothesis may be that some of the same words may belong to a buyer's address. A hypothesis for a word may be generated based on one or more features of the word (or sentence) that is known with certainty, such as a location of the word, a number of characters in the word, etc. A hypotheses generator implemented by the subsystem C 410 and/or the field detection engine 111 may generate multiple hypothesis for each SymSeq(x,y) based on the known features of this sequence.

A set of generated hypotheses may then be input into one or more neural networks of the subsystem C 410 to evaluate/test the generated hypotheses and to assign probability values to each generated hypothesis. A testing function may be used for hypotheses testing. The testing function may be determined based on evaluation of training inputs 122, comparison of the actual outputs of the subsystem C 410 with the training outputs 124 and adjustment of parameters of the testing function in such a way as to minimize the difference between the actual outputs of the subsystem 410 and the training outputs 124. Training of the testing function may be performed by using gradient boosting techniques, decision tree methods, or similar methods.

Next, the subsystem C 410 may form and test chains (sets) of hypotheses. For example, the subsystem C 410 may have determined that symbol sequence Word-1 with 95% probability belongs to field F1 and that Word-2 belongs to field F2 with 60% probability and to field A with 30% probability. Rather than deciding that Word-2 has to be associated with field B (according to the higher probability), the subsystem C 410 may analyze two chains of hypothesis: 1) Word-1 belongs to class K1 and Word 2 belongs to class K2, and 2) both Word-1 and Word-2 belong to class K1. The subsystem 410 may then determine that Word-1 and Word-2 should have a higher probability to belong to the same field than to different fields and, consequently, the hypothesis 2) should be a preferred hypothesis despite the individual determination of Word-2 favoring its belonging to class K1. In another example, a chain of hypothesis that leaves some fields empty may be disfavored compared with a chain that assigns at least one word to each of the fields.

Generation and testing of hypotheses for table identification may be performed in a similar way to generation and testing of word hypotheses. The horizontal lines output 370 may be used to generate hypotheses related to locations of rows of tables in the document. The vertical lines output 380 may be used to generate hypotheses related to locations of columns of tables in the document. The word-table correspondence output 390 may be used to generate hypotheses related to belonging of various alphanumeric sequences to various table partitions—rows, columns, and cells. For example, during hypotheses generation, a plurality of hypotheses may be generated about locations of alphanumeric sequences (e.g., words) relative to various horizontal and vertical lines, about association of words to cells of tables, etc. During testing of hypotheses, the neural network (e.g., subsystem C 410) determines probabilities for various hypotheses, chains of hypotheses, and analyses conflicts between hypotheses (and/or chains of hypotheses). As a result, the most probable hypotheses are selected, which may associate table partitions with alphanumeric sentences associated with (e.g., belonging to) these partitions. The evaluation of hypotheses (determination of probabilities) may be performed with heuristic methods, decision tree methods, gradient boosting methods, and so on. Classification of types of table partitions may be performed with the help of a function trained to evaluate features (vectors) of words belonging to various table partitions in training inputs 122.

After selection of the most probable hypotheses and/or chains of hypotheses, the symbol sequences SymSeq(x,y) may be classified according to the hypotheses (chains of hypotheses) which are determined to have the highest probabilities. A set of symbol sequences may be associated with each field of the document and/or partition of the table(s) present in the document. Each field/table partition may have one or more symbol sequences (e.g., single alphanumeric characters, single words, multiple words, sentences, etc.). Some fields/table partitions may have no identified symbols. The content of the identified fields/table partitions of the document may be stored, e.g., in repository 120, or any other storage device, including a local or a network (e.g., cloud) storage device. The content of the identified fields/table partitions may be stored as part of a profile of the document. The profile of the document may be stored in a dedicated file or folder associated with a recipient of the document, in one implementation. In other implementations, the profile of the document may be stored as part of a file or folder associated with an issuer of the document, with the type of the document, the time of issuance of the document, and the like.

In one implementation, after the fields/table partitions in the document are identified, the information about the identified fields/table partitions may be stored, e.g., in repository 120, or any other storage device, including a local or a network (e.g., cloud) storage device. The fields/table partitions may be identified by their absolute locations (e.g., coordinates) or relative locations (with respect to other fields/partitions). This information may be reused when a subsequent document of the same or similar type is input for identification of its field. In such instances, after OCR of the subsequent document, the fields/table partitions may be populated (and stored in a profile of the subsequent document) with the symbol sequences for the already determined fields/table partitions based on the coordinates (x,y) of the symbol sequences in the subsequent document. In such instances, the neural networks may not have to be used for detection of fields/table partitions in subsequent documents. In other implementations, where it may be expected that a subsequent document (or form) may be of a different edition or layout, the fields/table partitions (and their locations) identified for the original document may be used during field identification of the subsequent document as hypotheses. Such hypotheses may be tested together with other hypotheses that may be generated by the neural networks, as described above. A new layout of fields/table partitions detected in each additional document may be similarly added to the pool of hypotheses for field/table detection in future documents.

In one exemplary implementation, after a subsequent document is obtained, and a particular symbol sequence of the subsequent document is identified, it may be determined that the symbol sequence of the subsequent document has a location in the subsequent document that coincides, within a pre-determined accuracy, with the location of the first text field or with the first table partition in one of the earlier processed documents. It may then be determined that the symbol sequence of the subsequent document is associated with the first text field or with the first table partition.

In some implementations, the location of a text field or a table partition may be determined based on a placement of the alphanumeric sequence relative to at least one other symbol sequence of the plurality of symbol sequences. For example, placement of the alphanumeric sequence "tendered" may be defined relative to the location of another sequence "total amount."

FIGS. 5-12 are flow diagrams illustrating exemplary methods 500-1200 that use neural networks to account for the global document context in identification of fields and tables, in accordance with some implementations of the present disclosure. Each of methods 500-1200 may be performed by processing logic that may comprise hardware (e.g., circuitry, dedicated logic, programmable logic, microcode, etc.), software (such as instructions run on a processing device), firmware, or a combination thereof. In one implementation, methods 500-1200 may be performed by a processing device (e.g. a processing device 1302 of FIG. 13) of a computing device 110 and/or a server machine 150 as described in connection with FIG. 1. In certain implementations, methods 500-1200 may be performed by a single processing thread. Alternatively, methods 500-1200 may be performed by two or more processing threads, each thread executing one or more individual functions, routines, subroutines, or operations of the method. In an illustrative example, the processing threads implementing methods 500-1200 may be synchronized (e.g., using semaphores, critical sections, and/or other thread synchronization mechanisms). Alternatively, the processing threads implementing methods 500-1200 may be executed asynchronously with respect to each other. Therefore, while FIGS. 5-12 and the associated descriptions list the operations of methods 500-1200 in certain order, various implementations of the methods may perform at least some of the described operations in parallel and/or in arbitrary selected orders.

Figure 5:
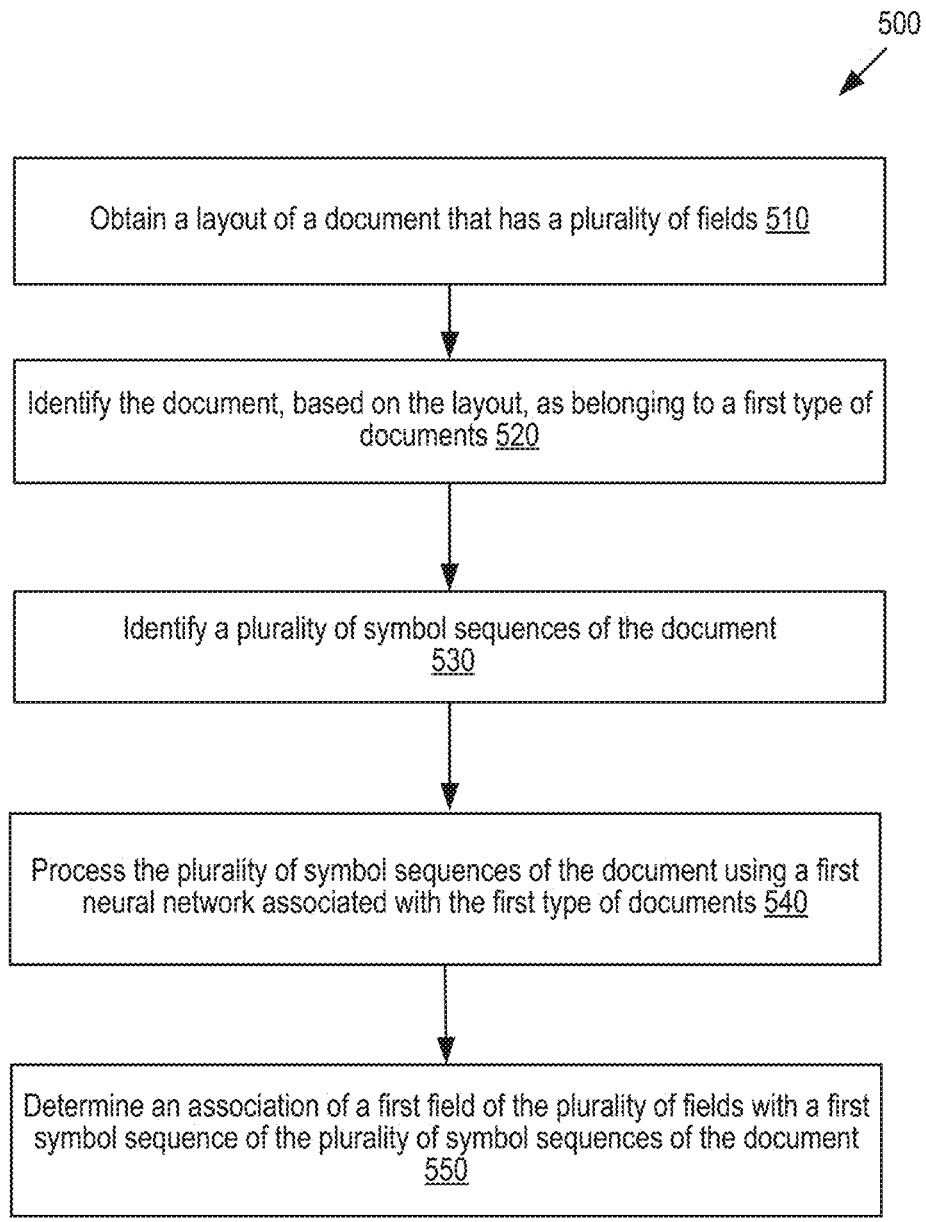
FIG. 5 is a flow diagram illustrating one exemplary method of selecting, based on a document layout, a neural network for identification of fields in documents, in accordance with some implementations of the present disclosure.

FIG. 5 is a flow diagram illustrating one exemplary method 500 of selecting, based on a document layout, a neural network for identification of fields in documents, in accordance with some implementations of the present disclosure. At block 510, the processing device performing method 500 may obtain a layout of a document that has a plurality of fields. The layout may include at least some of symbol sequences of the document. For example, the layout may include locations of certain words, sentences, or paragraphs, horizontal or vertical lines, etc. At block 520, based on the obtained layout, the processing device may identify the document as belonging to a first type of documents (e.g., "invoice") of a plurality of (previously) identified types of documents (e.g., a variety of financial types of documents). In some implementations, to identify the document as belonging to the first type of documents, the processing device may execute a clustering algorithm, as detailed below in relation to method 600 illustrated in FIG. 6.

At block 530, the method 500 may continue with identifying a plurality of symbol sequences of the document. Such symbol sequences may include numbers (e.g., dollar amounts), text (letters, words, sentences, paragraphs), special characters, images (logos), elements of tables (lines, cells), or any other symbols that may be identified in the document (e.g., by OCR of its image). At block 540, the processing device may process the plurality of identified symbol sequences of the document using a first neural network (e.g., the neural network 210-1) associated with the first type of documents. Based on the input of the symbol sequences, the first neural network may determine an association of a first field of the plurality of fields with a first symbol sequence of the plurality of symbol sequences of the document (block 550). For example, the first neural network may determine that the field "Account number" is associated with the symbol sequence "1375294," which may then be identified as the vendor's account number in the client's database.

Figure 6:
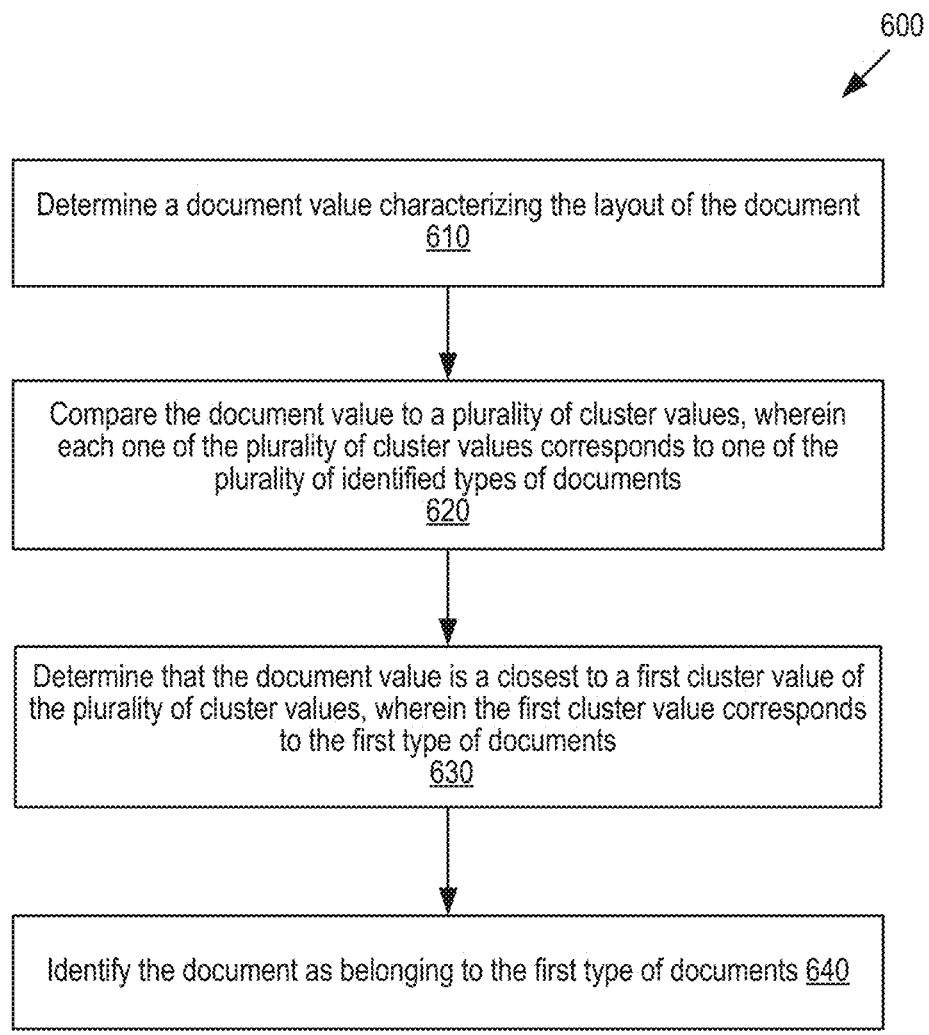
FIG. 6 is a flow diagram illustrating one exemplary method of using a clustering algorithm to select a neural network for identification of fields in documents, in accordance with some implementations of the present disclosure.

FIG. 6 is a flow diagram illustrating one exemplary method 600 of using a clustering algorithm to select a neural network for identification of fields in documents, in accordance with some implementations of the present disclosure. To make use of the clustering algorithm, the processing device implementing method 600 may determine, at block 610, a document value characterizing the layout of the document. To determine the document value, the processing device may begin with identifying one or more features of the document, such as the number of words and/or lines, locations and size of graphics present in the document, presence of specific words in the document, frequency of appearance of specific words and/or characters in the document, and so on. The processing device may associate a numerical value with each of the identified features. Correspondingly, the document value may be a vector value, having a plurality of numerical components, each component characterizing a degree to which a particular feature is present in the document. For example, a first component of the document (vector) value may be a number of times the word "amount" is present in the document.

At block 620, the processing device may compare the document value to a plurality of cluster values, wherein each one of the plurality of cluster values corresponds to one of the plurality of identified types of documents. Each of the cluster values may also be a vector value, having a plurality of numerical components, each component representing a cluster centroid value that characterizes a degree to which the corresponding feature is present in an average document of the cluster. At block 630, the method may continue with determining the document value is a closest to a first cluster value of the plurality of cluster values. For example, the processing device may compute the distance in the vector feature space between the document value and each of the cluster values and identify the first cluster as having the smallest distance. To determine the distance, the processing device may use a variety of different affinity (difference, similarity) functions, such as the least square distance function, in one implementation. At block 640, the method 600 may continue with identifying, based on the results of the comparison at block 630, that the document belongs to the first type of documents (associated with the first cluster).

Figure 7:
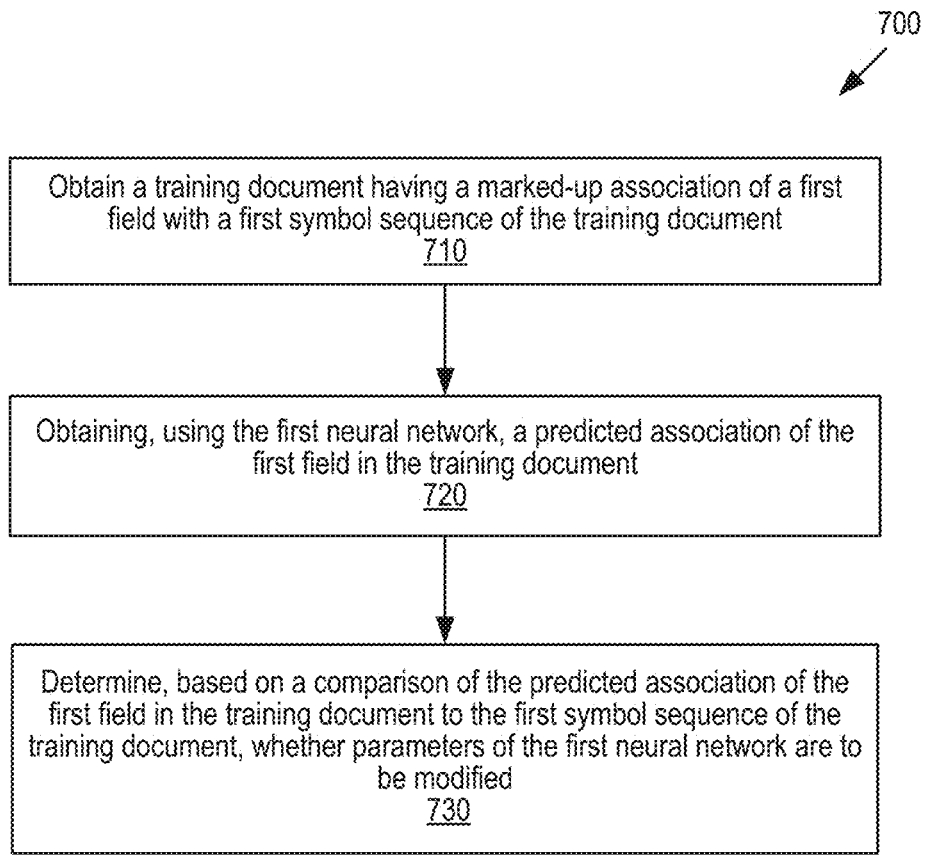
FIG. 7 is a flow diagram illustrating one exemplary method of training a neural network for identification of fields in documents, in accordance with some implementations of the present disclosure.

FIG. 7 is a flow diagram illustrating one exemplary method 700 of training a neural network for identification of fields in documents, in accordance with some implementations of the present disclosure. To train a neural network (e.g., neural network 210-1), the processing device implementing method 700 may, at block 710, obtain a training document having a marked-up association of a first field. The training document may be any document received by the client from one of client's vendors. The training document may be a financial document, a police report, an application form, or any other type of document. The training document may be similar to the document 140 illustrated in FIG. 1B. The document may have a plurality of fields; some of the fields may be of importance to the client whereas some of the fields may be of less interest to the client. For example, the fields "account number," "date," and "total" may be of most significance to the client, while the fields "address" and "ship to" may be of less significance. The marked-up association in the training document may be with a first symbol sequence of the training document. For example, the field "total" may have a marked-up association with the first symbol sequence, e.g., a symbol sequence ("$2,657,08") representing the amount—the value of the "total" field. The association may be identified by an employee of the client (or any other person) or by other methods known in the art, such as by flexible field descriptor algorithms.

At block 720, the processing device performing method 700 may obtain, using the first neural network, a predicted association of the first field in the training document. For example, the first neural network may predict that the first field "total" has a predicted association with the symbol sequence "$2,657,08" or with another symbol sequence "$1,932.14" of the training document. In some instances, the first neural network may fail to make a predicted association at all (a void association). At block 730, the processing device may determine, based on a comparison of the predicted association of the first field in the training document to the first symbol sequence of the training document, whether parameters of the first neural network are to be modified. For example, the processing device may compare the predicted association of the first field, e.g., to the amount "$2,657,08," or "$1,932.14," or a void association, to the marked up association ("$2,657,08") in the training document. If the predicted association correctly reproduces the marked-up association, the processing device may perform no adjustments of parameters (biases, weights, etc.) of the first neural network. If the predicted association is different from the marked-up association, or if the neural network has failed to identify the first field and predict an association at all, the processing device may modify the parameters of the first neural network. The parameters may be modified until the first neural network makes the correct prediction and successfully identifies the marked-up association.

Figure 8:
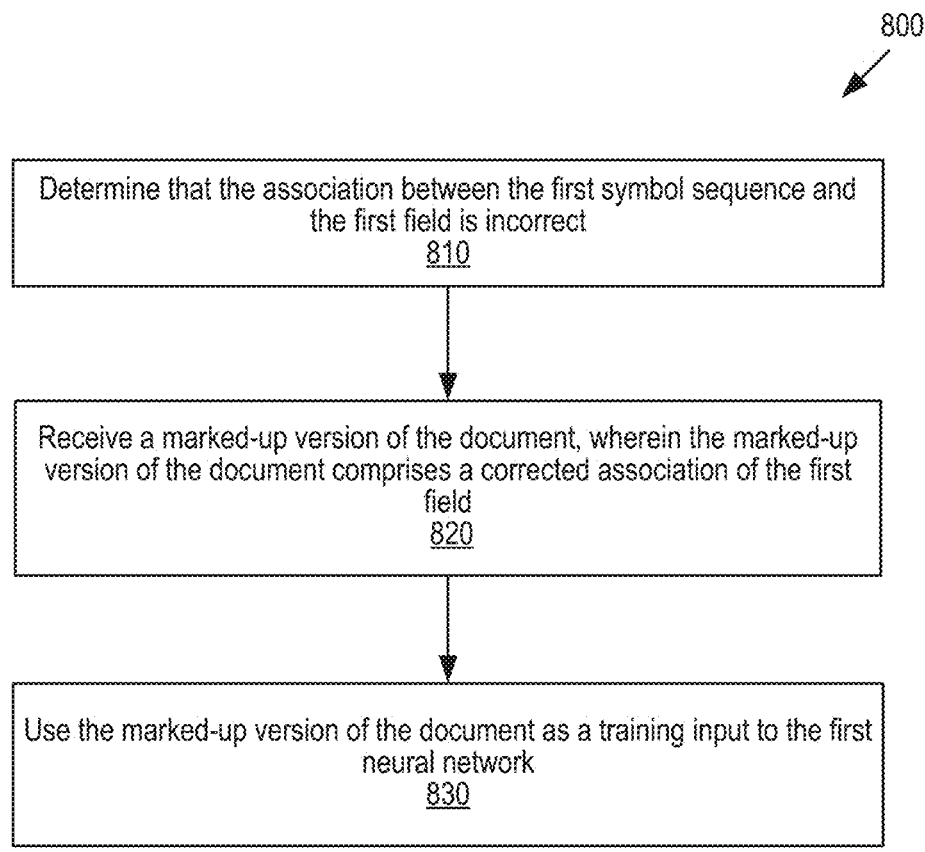
FIG. 8 is a flow diagram illustrating one exemplary method of retraining a neural network responsive to the neural network misidentifying an association of a field in a document, in accordance with some implementations of the present disclosure.

FIG. 8 is a flow diagram illustrating one exemplary method 800 of retraining a neural network responsive to the neural network misidentifying an association of a field in a document, in accordance with some implementations of the present disclosure. The first neural network may be initially trained using one or more marked-up training document, as described in relation to FIG. 7. The processing device may obtain an unmarked document (e.g., one of the documents 203), identify the unmarked document as belonging to the first type of documents, and use the first neural network (associated with the first type of documents) to process the unmarked document and obtain an association between the first symbol sequence and the first field in the document. At block 810, the processing device implementing method 800 may determine that the obtained association is incorrect. For example, a person reviewing (e.g., randomly or periodically) the output of the first neural network, may observe the incorrect association and flag the document for potential mark-up. The person may flag the document by sending an indication to the processing device (e.g., by a mouse click or by any other means, e.g., by a voice command) that the determined association is in error.

The person who flagged the document (or any other person) may create a marked-up version of the document by identifying a correct association of the first field and provide an image of the marked-up version of the document to the processing device. At block 820, the processing device performing method 800 may receive the marked-up version of the document, the marked-up version of the document having a corrected association of the first field. At block 830, the processing device may use the marked-up version of the document as a training input to retrain the first neural network. In some implementations, the processing device may then perform some or all of the blocks of the training method 700, as described above.

Figure 9:
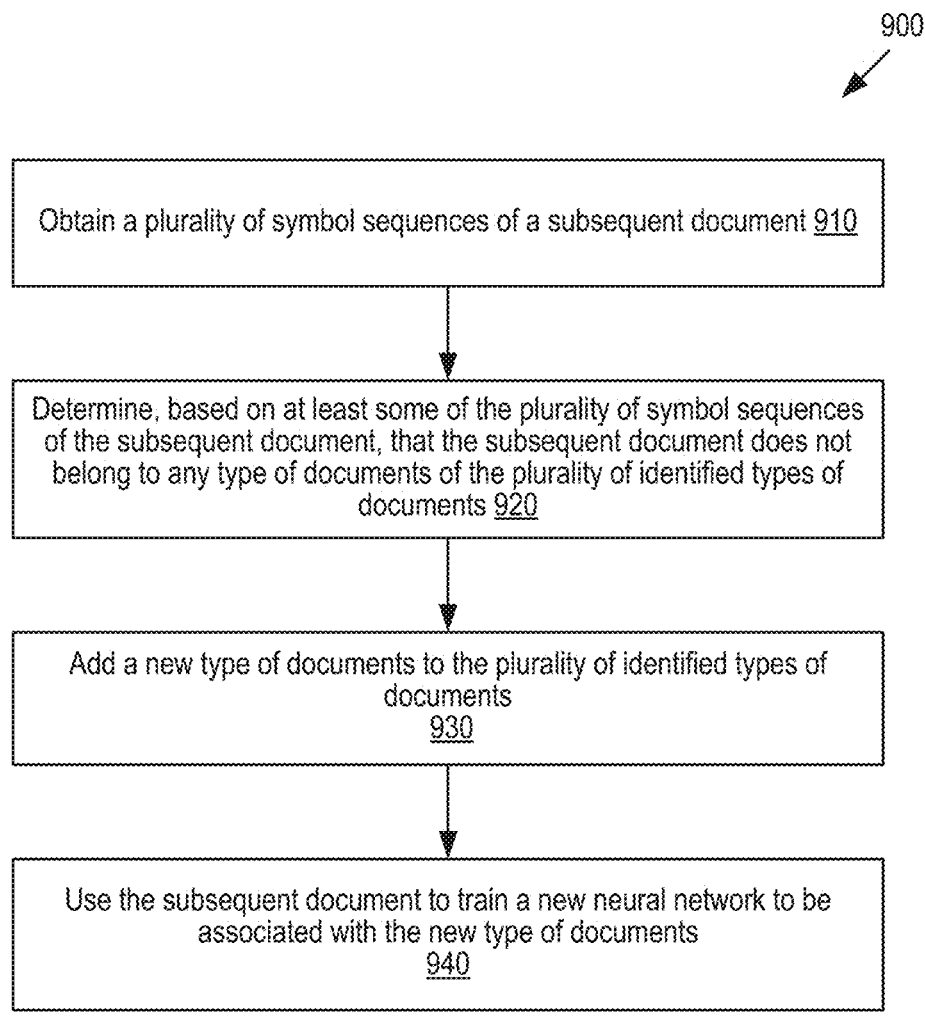
FIG. 9 is a flow diagram illustrating one exemplary method of adding a neural network responsive to determining that an input document does not belong to previously identified types of documents, in accordance with some implementations of the present disclosure.

FIG. 9 is a flow diagram illustrating one exemplary method 900 of adding a neural network responsive to determining that an input document does not belong to previously identified types of documents, in accordance with some implementations of the present disclosure. Method 900 may be implemented by the field detection engine 111 utilizing a processing device, in one implementation. The field detection engine may include the clustering engine 112. The field detection engine 111 and/or the clustering engine 112 may have access to a plurality of previously trained neural networks, each capable of detecting fields in documents belonging to a corresponding type (cluster) of documents. The field detection engine may be processing in the manner described above, e.g., performing an OCR of a subsequent input document (e.g, one of the documents 203), in one implementation. In other implementation, the field detection engine may be accessing a digital file containing a previously performed OCR of the input document (e.g., produced by a different, e.g., outside, component or agent).

At block 910, the method 900 may obtain a plurality of symbol sequences of the subsequent document that has a plurality of fields. At block 920, method 900 may determine, based on at least some of the plurality of symbol sequences of the subsequent document, that the subsequent document does not belong to any type of documents of the plurality of already identified types of documents. For example, the clustering engine may perform a clustering analysis (as illustrated in FIG. 6, in one example) and determine that a distance between the determined document value for the subsequent document is too far from any of the existing cluster values. More specifically, each of the determined distances may exceed some pre-determined maximum distance (this maximum distance may be cluster-dependent), thus indicating that the subsequent document may not be reliably associated with the existing types (clusters) of documents and that a new cluster is to be established. At block 930, the method 900 may add a new type of documents to the plurality of identified types of documents, establishing a new cluster based on the subsequent document. For example, the components of the document value vector may be taken as initial feature centroids for the new cluster. As additional documents are later identified and added to the new cluster, the centroids may be recalculated (e.g., as arithmetic, geometric, weighted, or other averages of the corresponding components for all or some of the processed documents that were identified as belonging to the new cluster).

At block 940, the method 900 may continue with instantiating a new neural network (e.g., the neural network 210-N) to be associated with the new type of documents and using the subsequent document to train the new neural network. For example, the processing device performing method 900, responding to instructions from the clustering engine 112, in one implementation, may output "a new type of document detected," or a similar message, in conjunction with the subsequent document. A person reviewing the output may retrieve the subsequent document and create a marked-up version of the subsequent document by marking up associations of the fields that may be of interest to the client. The field detection engine 111 may receive an image of the marked-up version of the subsequent document. The marked-up version of the subsequent document may identify one or more fields of the subsequent document. The processing device may use the marked-up version of the document as a training input to train the new neural network. As additional documents are later identified as belonging to the new type of documents, some of those additional documents may be marked up and used to further train the new neural network. In some implementations, the first M documents belonging to the new type may be marked-up and used for training. In other implementations, only those of the additional documents may be marked-up and used for training where the new neural network has failed to identify or misidentified at least one of the fields, as described in relation to method 800 illustrated in FIG. 8.

Figure 10:
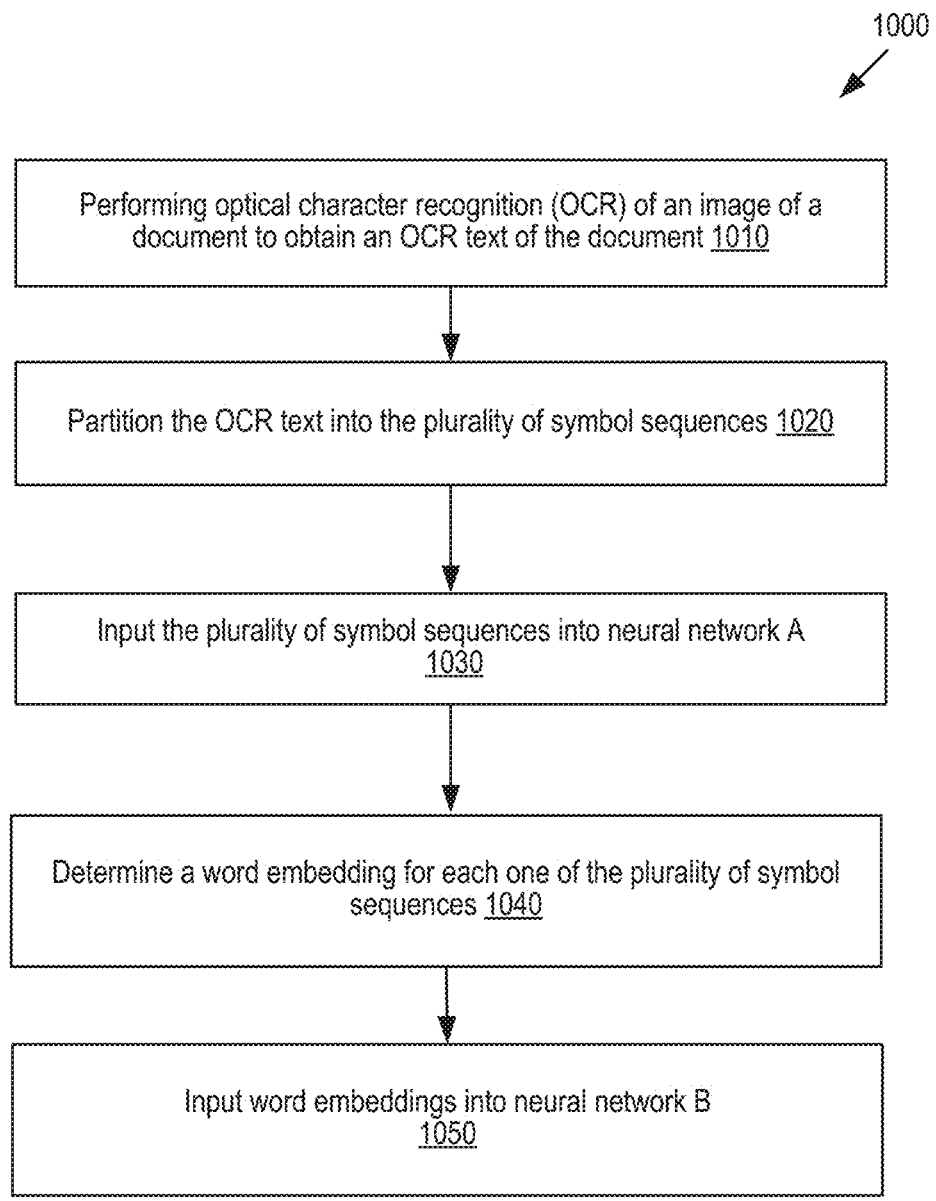
FIG. 10 is flow diagram illustrating one exemplary method that uses neural networks to determine vector representations (e.g., word embeddings) for symbol sequences identified in an image of a document, in accordance with some implementations of the present disclosure.

FIG. 10 is flow diagram illustrating one exemplary method 1000 that uses neural networks to determine vector representations (e.g., word embeddings) for symbol sequences identified in an image of a document, in accordance with some implementations of the present disclosure. Some of the blocks of method 1000 (e.g., blocks 1010 and 1020) may be performed prior to determining the type of the document whereas some of the blocks of method 1000 (e.g., blocks 1030, 1040, and 1050) may be performed using a specific neural network for the documents of the determined type. At block 1010, the processing device (e.g., a computer) implementing method 1000 may perform optical character recognition (OCR) of an image of a document to obtain an OCR text of the document. In some implementations, the document may have a plurality of fields populated with alphanumeric symbol sequences. In some implementations, the document may also have at least one table having a plurality of partitions, such as cells, rows, and/or columns.

At block 1020, the processing device performing method 1000 may partition the OCR text into the plurality of symbol sequences SymSeq(x,y) of the document. Symbol sequences may be alphanumeric, graphic, or combined. Alphanumeric sequences may represent text (syllables, words, sentences), numbers, glyphs, and so on. Graphic sequences may represent table graphics elements, such as a horizontal line, a vertical line, an oblique line, a corner (a two-way line intersection that may be indicative of a corner table partition), a three-way line intersection (that may be indicative of an edge table partition), or a four-way line intersection (that may be indicative of an inside table partition). A combined sequence may be a combination of one or more alphanumeric symbols and one or more table graphics elements. A sequence may have a plurality of symbols, but may be a single symbol, in some instances.

At block 1030, the processing device performing method 1000 may input the plurality of symbol sequences into neural network A. The neural network A may be the subsystem (subnetwork) A (240) described in relation to FIG. 2C. The neural network A may be specific to the neural network associated with the specific type of documents identified by the clustering engine 112. In some implementations, the neural network A may be shared by some of the plurality of neural networks associated with different types of documents. The purpose of the neural network A may be to determine a plurality of vectors representative of the symbol sequences determined at block 1020. In particular, at block 1040, the neural network A may determine a word embedding for each one of the plurality of symbol sequences. The word embeddings may be vectors $vec(x,y)=(Z_1, Z_2, \ldots Z_N)$ corresponding to the identified symbol sequences SymSeq(x,y), as described above in relation to FIG. 2C. The neural network A may be previously trained on input documents, which may be of a similar type to the target document.

The determined vectors (e.g., word embeddings) vec(x, y)=($Z_1, Z_2, \ldots Z_N$) may be input into the neural network B (1050). The neural network B may be the subsystem B (260) described in relation to FIG. 2C. The purpose of the neural network B may be to recalculate vectors {vec(x,y)}→{VEC (x,y)} taking into account a global context of the entire document. The neural network B may be specific to the neural network associated with the specific type of documents identified by the clustering engine 112. In some implementations, the neural network B may be shared by some of the plurality of neural networks associated with different types of documents.

Figure 11:
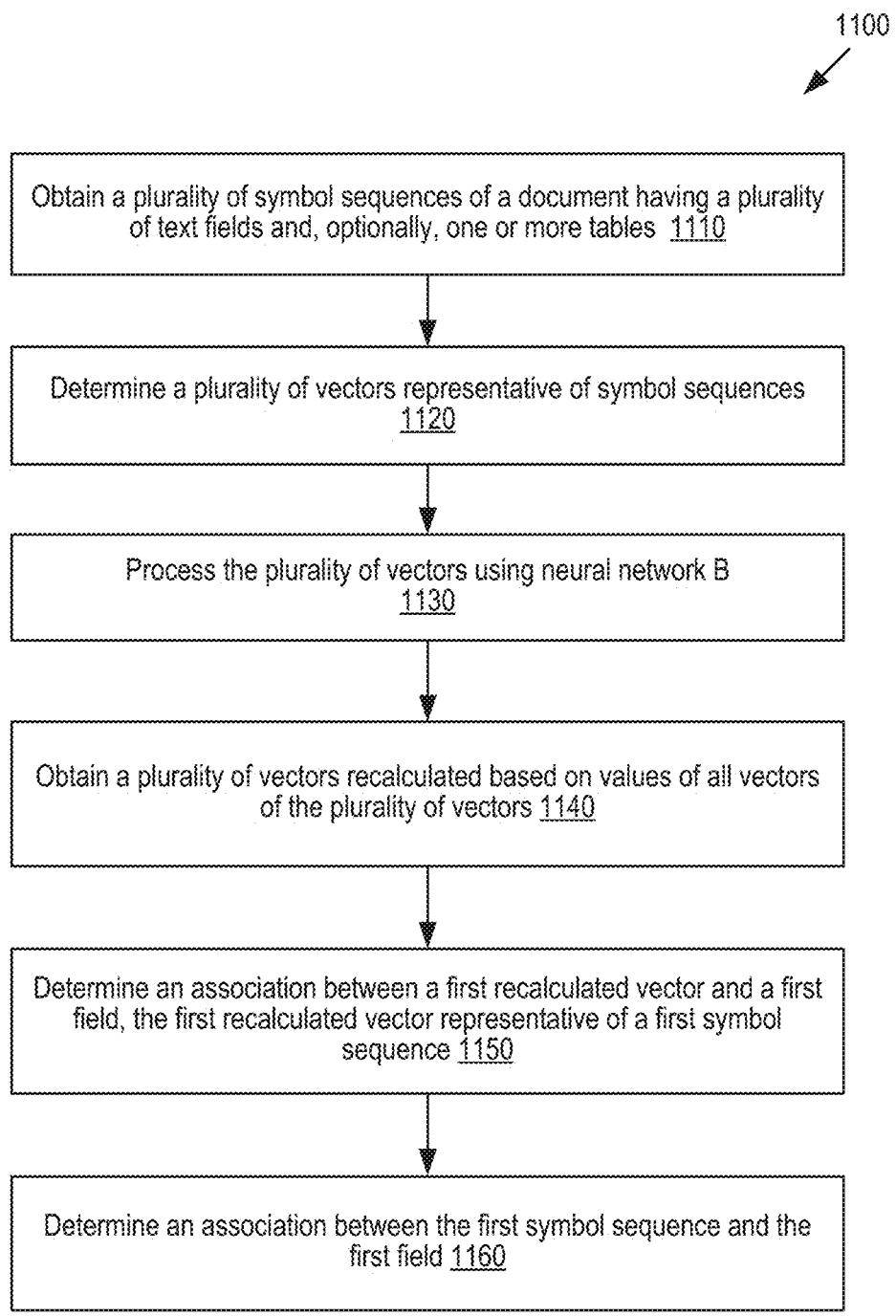
FIG. 11 is flow diagram illustrating one exemplary method that uses neural networks to determine associations between symbol sequences and fields/tables of a document using the global document context, in accordance with some implementations of the present disclosure.

FIG. 11 is flow diagram illustrating one exemplary method 1100 that uses neural networks to determine associations between symbol sequences and fields of a document using the global document context, in accordance with some implementations of the present disclosure. At block 1110, a processing device performing method 1100 may obtain a plurality of symbol sequences of a document having a plurality of fields and, optionally, one or more tables. In one implementation, operations performed at block 1110 may be similar to operations performed at blocks 1010 and 1020 of method 1000. At block 1120, the processing device may determine a plurality of vectors vec(x,y) representative of symbol sequences. In one implementation, operations performed at block 1110 may be similar to operations performed at blocks 1030 and 1040 of method 1000.

At block 1130 the method 1100 may continue with processing the plurality of vectors {vec(x,y)} using neural network B. The output of the neural network B may be a plurality of vectors, {vec(x,y)}→{VEC(x,y)}, recalculated based on values of all or some of the vectors of the plurality of vectors (1140). To obtain the plurality of recalculated vectors, the processing device performing method 1100 may use a horizontal-pass network 310 and/or a vertical-pass network 320, as described in connection with FIG. 3. The outputs of the networks 310 and 320 may be concatenated and the set of recalculated vectors {VEC(x,y)} may be determined from the concatenated results, as described above.

At block 1150, the method may continue with determining an association between a first recalculated vector and a first field, the first recalculated vector being representative of a first symbol sequence. For example, a field "total" may be associated with a recalculated vector that corresponds to an amount listed in an invoice document. At block 1160, method 1100 may continue with determining an association between the first symbol sequence and the first field or (when at least one table is present) an association between the alphanumeric sequence and the table partition.

Figure 12:
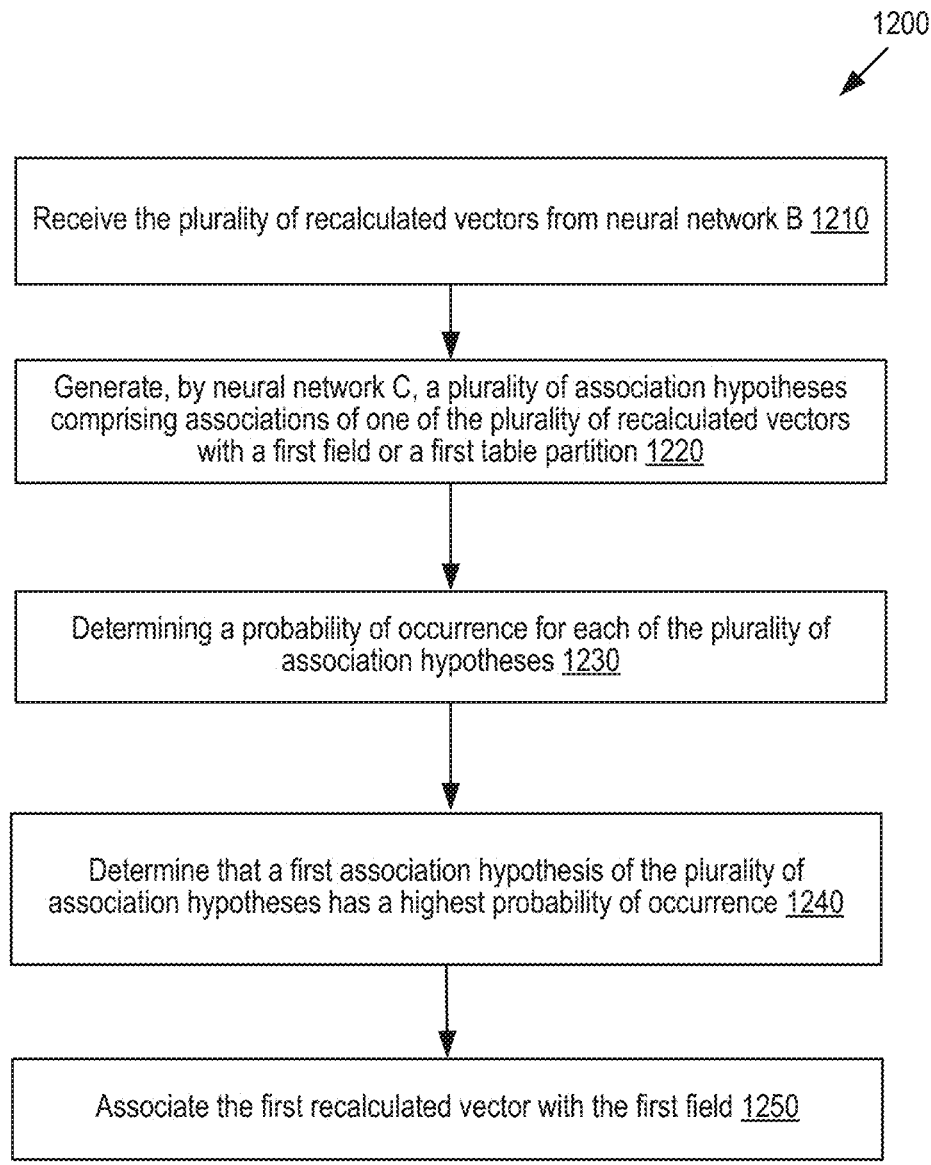
FIG. 12 is flow diagram illustrating one exemplary method that uses neural networks to generate and test a plurality of hypotheses of associations between symbol sequences and fields/tables of a document, in accordance with some implementations of the present disclosure.

FIG. 12 is flow diagram illustrating method 1200 that uses neural networks to generate and test a plurality of hypotheses of associations between symbol sequences and fields/tables of a document, in accordance with some implementations of the present disclosure. In some implementations, the method 1200 may implement blocks 1150, 1152, and 1160 of the method 1100. For example, at block 1210 the method 1200 may receive the plurality of recalculated vectors {VEC(x,y)} from the neural network B. At block 1220, the processing device performing method 1200 may generate, by a neural network C, a plurality of association hypotheses comprising associations of one of the plurality of recalculated vectors with a first field or with a table partition. In some implementations, the neural network C may be the subsystem C (410) of FIG. 4. For example, a hypothesis may be that an n-th vector representing the alphanumeric sequence "$128" is associated with a field "amount tendered" that is known to be present (or may be present, with some probability) in the document. As another illustrative example, a hypothesis may be that an m-th vector representing the alphanumeric sequence "total" is associated with the rightmost cell in the first row of a table that may be present in the document.

At block 1230, the method may continue with determining a probability of occurrence for each of the plurality of association hypotheses. This may be performed using one or more neural layers of the network C by utilizing a testing function, in one implementation. The testing function may be determined based on evaluation of training inputs (e.g., training inputs 122) and comparing the outputs of the network C with the training outputs 124 and tuning parameters of the testing function to minimize the difference between the current outputs and the training outputs.

At block 1240, it may be determined that a first association hypothesis of the plurality of association hypotheses has a highest probability of occurrence. For example, the first association hypothesis may include an association of the first recalculated vector with the second recalculated vector. The highest probability may refer to an association of a given symbol sequence with a particular field or with a particular table partition, in one possible implementation. In other words, the hypotheses may be grouped by symbol sequences (e.g., all possible hypotheses of association of the symbol sequence "$128" with various fields may be grouped together). Accordingly, within a given group, a plurality of hypotheses of possible associations of a specific symbol sequence with various fields/table partitions may be analyzed and the highest probability hypothesis may be selected. In another possible implementation, the hypotheses may be grouped by fields or by table partitions. For example, all possible hypotheses of association a table cell (2,4)—e.g., a cell in the fourth column of the second row—with various alphanumeric sequences may be grouped together and the highest probability hypothesis of association of the cell (2,4) may be selected.

At block 1250, the method 1200 may continue with the processing device selecting the highest probability hypothesis and associating the first recalculated vector with the first field or with the first table partition.

Figure 13:
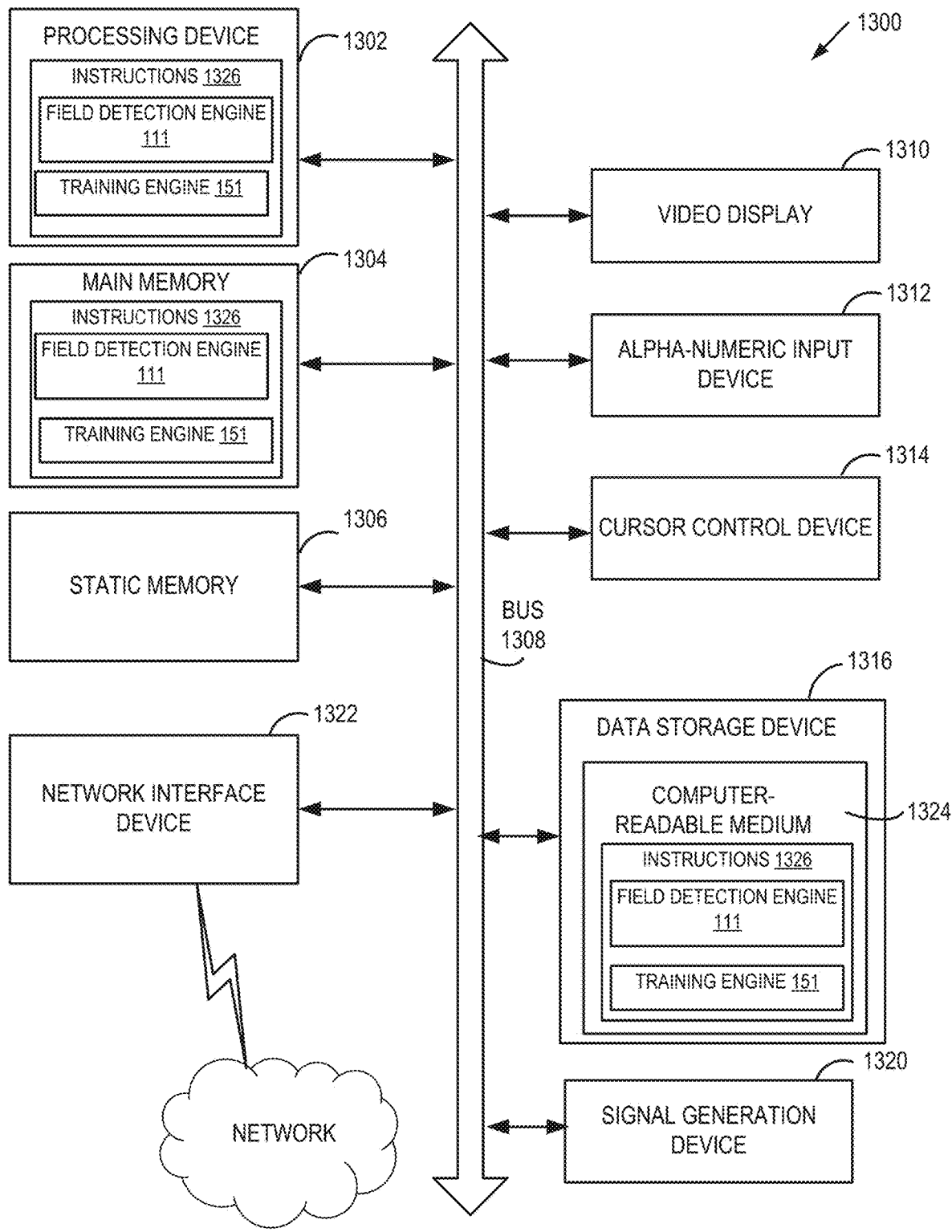
FIG. 13 illustrates a block diagram of a computer system in accordance with some implementations of the present disclosure.

FIG. 13 depicts an example computer system 1300 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1300 includes a processing device 1302, a main memory 1304 (e.g., read-only memory (ROM), flash memory, dynamic random access memory (DRAM) such as synchronous DRAM (SDRAM)), a static memory 1306 (e.g., flash memory, static random access memory (SRAM)), and a data storage device 1316, which communicate with each other via a bus 1308.

Processing device 1302 represents one or more general-purpose processing devices such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1302 may also be one or more special-purpose processing devices such as an application specific integrated circuit (ASIC), a field programmable gate array (FPGA), a digital signal processor (DSP), network processor, or the like. The processing device 1302 is configured to execute instructions 1326 for implementing the field detection engine 111 and/or the training engine 151 of FIG. 1A and to perform the operations and steps discussed herein (e.g., methods 600-1200 of FIGS. 6-12).

The computer system 1300 may further include a network interface device 1322. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1320 (e.g., a speaker). In one illustrative example, the video display unit 1310, the alphanumeric input device 1312, and the cursor control device 1314 may be combined into a single component or device (e.g., an LCD touch screen).

The data storage device 1316 may include a computer-readable storage medium 1324 on which is stored the instructions 1326 embodying any one or more of the methodologies or functions described herein. The instructions 1326 may also reside, completely or at least partially, within the main memory 1304 and/or within the processing device 1302 during execution thereof by the computer system 1300, the main memory 1304 and the processing device 1302 also constituting computer-readable media. In some implementations, the instructions 1326 may further be transmitted or received over a network via the network interface device 1322.

While the computer-readable storage medium 1324 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
   obtaining a layout of a document, the document having a plurality of fields;
   identifying the document, based on the layout, as belonging to a first type of documents of a plurality of identified types of documents;
   identifying a plurality of symbol sequences of the document;
   processing, by a processing device, the plurality of symbol sequences of the document using a first neural network associated with the first type of documents to generate a plurality of feature vectors;
   using the plurality of feature vectors to form one or more association hypotheses, wherein each of the one or more association hypotheses associates one of the plurality of fields of the document with at least one of the plurality of feature vectors;
   determining, using the one or more association hypotheses, an association of a first field of the plurality of fields with a first set of one or more symbol sequences of the plurality of symbol sequences of the document; and
   causing a representation of the first set of the one or more symbol sequences to be stored in a computer memory in association with a profile of the document.

2. The method of claim 1, wherein the layout comprises locations of at least some of the plurality of symbol sequences of the document.

3. The method of claim 1, wherein identifying the document as belonging to the first type of documents comprises executing a clustering algorithm.

4. The method of claim 3, wherein executing the clustering algorithm comprises:
   determining a document value characterizing the layout of the document;
   comparing the document value to a plurality of cluster values, wherein each one of the plurality of cluster values corresponds to one of the plurality of identified types of documents; and
   determining that the document value is a closest to a first cluster value of the plurality of cluster values, wherein the first cluster value corresponds to the first type of documents.

5. The method of claim 1, wherein the first neural network is trained by:
   obtaining a training document having a marked-up association of a first field, wherein the marked-up association is with a first symbol sequence of the training document;
   obtaining, using the first neural network, a predicted association of the first field in the training document; and
   determining, based on a comparison of the predicted association of the first field in the training document to the first symbol sequence of the training document, whether parameters of the first neural network are to be modified.

6. The method of claim 1, further comprising:
   determining that the association between the first set of one or more symbol sequences and the first field of the document is incorrect;
   receiving a marked-up version of the document, wherein the marked-up version of the document comprises a corrected association of the first field; and
   using the marked-up version of the document as a training input into the first neural network.

7. The method of claim 1, further comprising:
   obtaining a plurality of symbol sequences of a subsequent document, the subsequent document having a plurality of fields;
   determining, based on at least some of the plurality of symbol sequences of the subsequent document, that the subsequent document does not belong to any type of documents of the plurality of identified types of documents;
   adding a new type of documents to the plurality of identified types of documents; and
   using the subsequent document to train a new neural network to be associated with the new type of documents.

8. The method of claim 7, wherein using the subsequent document to train the new neural network comprises using a marked-up version of the subsequent document, wherein the marked-up version of the subsequent document identifies one or more fields of the subsequent document.

9. The method of claim 1, wherein identifying the plurality of symbol sequences of the document comprises:

performing optical character recognition (OCR) of an image of the document to obtain an OCR text of the document; and partitioning the OCR text into the plurality of symbol sequences.

10. The method of claim 1, wherein processing the plurality of symbol sequences using the first neural network comprises:

determining a plurality of initial vectors, wherein a vector of the plurality of initial vectors is representative of one of the plurality of symbol sequences; and recalculating the plurality of vectors using one or more subnetworks of the first neural network to obtain a plurality of feature vectors, wherein each of the plurality of feature vectors is recalculated based on values of the plurality of initial vectors.

11. The method of claim 10, wherein determining the plurality of initial vectors representative of the plurality of symbol sequences comprises determining, using a second neural subnetwork, a word embedding for each one of the plurality of symbol sequences.

12. The method of claim 10, wherein the one or more subnetworks of the first neural network comprise at least one hidden layer of neurons.

13. The method of claim 10, wherein a first subnetwork of the one or more subnetworks is to recalculate the plurality of vectors in a direction of increasing or decreasing horizontal coordinates of the vectors, and wherein a second subnetwork of the one or more subnetworks is to recalculate the plurality of vectors in a direction of increasing or decreasing vertical coordinates of the vectors.

14. The method of claim 10, wherein determining the association of the first field with the first set of one or more symbol Sequences comprises:

determining a probability of occurrence for each of the one or more association hypotheses.

15. A non-transitory machine-readable storage medium including instructions that, when accessed by a processing device, cause the processing device to:

obtain a layout of a document, the document having a plurality of fields;

identify the document, based on the layout, as belonging to a first type of documents of a plurality of identified types of documents;

identify a plurality of symbol sequences of the document;

process the plurality of symbol sequences of the document using a first neural network associated with the first type of documents to generate a plurality of feature vectors;

use the plurality of feature vectors to form one or more association hypotheses, wherein each of the one or more association hypotheses associates one of the plurality of fields of the document with at least one of the plurality of feature vectors;

determine, using the one or more association hypotheses, an association of a first field of the plurality of fields of the document with a first set of one or more symbol sequences of the plurality of symbol sequences of the document; and cause a representation of the first set of the one or more symbol sequences to be stored in a computer memory in association with a profile of the document.

16. The non-transitory machine-readable storage medium of claim 15, wherein to identify the document as belonging to the first type of documents, the instructions are to cause the processing device to execute a clustering algorithm.

17. The non-transitory machine-readable storage medium of claim 16, wherein to cause the processing device to execute a clustering algorithm the instructions are to cause the processing device to:

determine a document value characterizing the layout of the document;

compare the document value to a plurality of cluster values, wherein each one of the plurality of cluster values corresponds to one of the plurality of identified types of documents; and determine that the document value is a closest to a first cluster value of the plurality of cluster values, wherein the first cluster value corresponds to the type of documents.

18. The non-transitory machine-readable storage medium of claim 15, wherein to process the plurality of symbol sequences using the first neural network the instructions are to cause the processing device to:

determine a plurality of initial vectors, wherein a vector of the plurality of initial vectors is representative of one of the plurality of symbol sequences;

recalculate the plurality of vectors using one or more subnetworks of the first neural network to obtain a plurality of feature vectors, wherein each of the plurality of feature vectors is recalculated based on values of the plurality of initial vectors.

19. The non-transitory machine-readable storage medium of claim 18, wherein to cause the processing device to determine the association of the first field with the first set of one or more symbol sequences, the instructions are to cause the processing device to:

determine a probability of occurrence for each of the one or more association hypotheses; and determine that a first association hypothesis of the one or more association hypotheses has a highest probability of occurrence, wherein the first association hypothesis comprises an association of a first feature vector of the plurality of feature vectors with the first field.

20. A system comprising:

a memory; and a processing device operatively coupled to the memory, the processing device to:

obtain a layout of a document, the document having a plurality of fields;

identify the document, based on the layout, as belonging to a first type of documents of a plurality of identified types of documents;

identify a plurality of symbol sequences of the document;

process, by a processing device, the plurality of symbol sequences of the document using a first neural network associated with the first type of documents to generate a plurality of feature vectors;

use the plurality of feature vectors to form one or more association hypotheses, wherein each of the one or more association hypotheses associates one of the plurality of fields of the document with at least one of the plurality of feature vectors;

determine, using the one or more association hypotheses, an association of a first field of the plurality of fields of the document with a first set of one or more symbol sequences of the plurality of symbol sequences of the document and cause a representation of the first set of the one or more symbol sequences to be stored in the memory in association with a profile of the document.

* * * * *